United States Patent [19]

Inaji et al.

[11] Patent Number: 5,177,416
[45] Date of Patent: Jan. 5, 1993

[54] BRUSHLESS DC MOTOR

[75] Inventors: Toshio Inaji, Minoo; Makoto Gotou, Nishinomiya, both of Japan

[73] Assignee: Matsushita Electric Industrial Co., Ltd., Osaka, Japan

[21] Appl. No.: 716,984

[22] Filed: Jun. 18, 1991

[30] Foreign Application Priority Data

Jun. 20, 1990 [JP] Japan ................... 2-161804
Jun. 20, 1990 [JP] Japan ................... 2-161805
Jul. 13, 1990 [JP] Japan ................... 2-186546

[51] Int. Cl.⁵ ............................................. H02P 6/02
[52] U.S. Cl. ................................... 318/254; 318/138; 318/431
[58] Field of Search ............... 318/138, 254, 439, 430, 318/431

[56] References Cited

U.S. PATENT DOCUMENTS

| | | |
|---|---|---|
| 4,276,504 | 6/1981 | Nagase et al. |
| 4,694,210 | 9/1987 | Elliott et al. ........... 310/68 R |
| 4,712,050 | 12/1987 | Nagasawa et al. ........ 318/254 |
| 4,743,815 | 5/1988 | Gee et al. ............... 318/254 |
| 4,874,993 | 10/1989 | Tanaka et al. ........... 318/254 |
| 4,928,043 | 5/1990 | Plunkett ................. 318/254 |
| 4,983,894 | 1/1991 | Oku et al. ............... 318/138 |
| 5,013,985 | 5/1991 | Itoh et al. ............... 318/558 |
| 5,019,756 | 5/1991 | Schwarz ................. 318/254 |

FOREIGN PATENT DOCUMENTS

| | | |
|---|---|---|
| 0316077 | 5/1989 | European Pat. Off. . |
| 0363073 | 4/1990 | European Pat. Off. . |
| 0363169 | 4/1990 | European Pat. Off. . |
| 2856538 | 8/1979 | Fed. Rep. of Germany . |
| 55-160980 | 12/1980 | Japan . |
| 62-260586 | 11/1987 | Japan . |

Primary Examiner—Bentsu Ro
Attorney, Agent, or Firm—Wenderoth, Lind & Ponack

[57] ABSTRACT

A brushless DC motor which does not have a position sensor for detecting a rotational position of the rotor, is arranged so that conducting phases of the stator windings to be detected are subsequently selected by multiphase selection signals in response to a conducting state of the stator windings; then, a pulse signal train is generated by detecting the counter electromotive forces induced in the conducting phases subsequently selected and a trapezoidal waveform signal is formed by a slant waveform signal generated in response to the pulse signal train thus obtained. Furthermore, with the trapezoidal waveforms signal thus formed as position signal of the rotor, an electric current signal having a trapezoidal waveform is supplied; to the stator windings, resulting in smooth commutation of the conducting phase of the stator windings. When the motor is to be started, phase commutation of the stator windings is carried out forcibly by means of a pseudo output pulse, thus providing a starting characteristic compatible with that obtained in conventional motors having a rotor position sensor.

57 Claims, 19 Drawing Sheets

BRUSHLESS DC MOTOR

BACKGROUND OF THE INVENTION

1. Field of the Invention

This invention relates to a brushless DC motor and more particularly, to a brushless DC motor which does not have a position sensor for detecting a rotational position of a permanent magnet rotor.

2. Description of the prior art

Recently, brushless DC motors have been widely used in industrial or audio and video equipment requiring higher reliability for reasons that service life can be improved as well as noise generation can be reduced resulting from such an advantage that they do not need to have a mechanical contact as would be used in conventional DC motors having brushes.

In order to perform the commutating operation of a conducting phase of the stator windings of a motor, most of conventional brushless DC motors use a rotor position sensor (such as, for example, the Hall sensor) instead of using brushes. However, the rotor position sensor itself is expensive and requires sophisticated positional adjustment for setting and increased wiring, so that the cost of brushless DC motors is large as compared with DC motors having brushes.

In addition, some structural limitations will be frequently imposed thereupon for the reason that a rotor position sensor has to be set inside the motor itself. A recent trend is that accompanied with the miniaturization of industrial or audio and video equipment, motors to be used are made small in size and thickness, which means that the sectional space where a rotor position sensor such as a Hall effect sensor is to be provided becomes extremely small. As a result, several types of brushless DC motors having no position sensor such as, for example, a Hall effect sensor have been proposed previously.

Out of which, a brushless DC motor disclosed, for example, in Laid-Open Japanese Patent Application No. 55-160980 is based on the so-called half wave driving method in which an electric current is supplied unidirectionally to stator windings of the rotor. With this method, counter electromotive forces induced in two stator windings being stationary out of three-phase stator windings are detected, and the signals thus detected are operationally processed to determine the next conducting phase so as to thereby supply an electric current unidirectionally to the stator windings in a successive manner. With this method, however, because the rotor is stationary when starting a motor, no counter electromotive force is generated in each of the stator windings. As a result, in such a brushless DC motor as described above according to the prior art, a starting circuit is specially for exciting a specific stator winding so as to thereby determine the initial position of the rotor in advance. In this case, however, even if only one phase of the stator windings is excited in order to determine the initial position of the rotor as shown above, the position of the rotor becomes vibrative and difficult to stabilize, resulting in an increase in starting time.

In addition, the brushless DC motor according to the prior art is based on the half wave driving method in which an electric current is supplied unidirectionally to its stator windings, so that its driving circuit can be made simple in structure on the one hand, but on the other hand, the utility and efficiency of the stator windings are low as compared with a brushless DC motor based on the full wave driving method in which an electric current is supplied bidirectionally to its stator windings, so that the torque developed is small.

Also, disclosed, for example, in Japanese Laid-Open Patent Application No. 62-260586 is a brushless DC motor which is based on the so-called full wave driving method in which an electric current is supplied bidirectionally to its stator windings. An electric current flowing to its stator windings is commutated forcibly and successively when starting by a starting pulse signal outputted from a starting pulse generating circuit so as to thereby drive the motor. When the rotational speed of the motor is accelerated and counter electromotive forces are induced in the stator windings, zero-crossing points of the counter electromotive forces are detected thereby to delay its output signal by a constant period of time by a monostable multi-vibrator; thus, the timing of conducting an electric current is determined. In this case, however, even when the stator windings are commutated forcibly and successively by a pulse signal outputted from the starting circuit when starting, the rotor becomes vibrative in rotation. As a result, even if a zero-crossing point of each counter electromotive force can be properly detected by a detection circuit, the switching is difficult to be properly changed from the starting mode to drive the rotor by commutating the stator windings forcibly and successively to the normal position detecting mode to drive the rotor by detecting the zero-crossing points of counter electromotive forces induced in the stator windings. That is, the timing of switching from the starting mode to the normal position detecting mode of the rotor is difficult technologically, resulting in an increase in starting time of the motor.

In addition, the brushless DC motor according to the prior art as described above uses a method such that the conducting phase is determined by delaying a pulse signal generated at the zero-crossing point of a counter electromotive force induced in each stator winding by a constant period of time through a monostable multi-vibrator. In this case however, the delay time is constant and is independent of the rotational speed of the motor, which means that it is not suitable for an application such that the rotational speed has to be changed, thus lacking in flexibility of application.

Generally, in these brushless DC motors not having a rotor position sensor, the rotor is stationary when starting, and no counter electromotive force is generated in each stator winding. As a result, the conducting phase at the initial stage is not allowed to be determined and such a problem has been further pointed out that they are outstandingly inferior in starting characteristic to DC motors having a rotor position sensor.

Also, these brushless DC motors not having a rotor position sensor are considered as a kind of synchronous motor in that the phase commutation is forcibly operated when starting, and the frequency for phase-commutation suitable for the starting operation is largely varied depending on the magnitude of a load to be applied to the motor or the inertia of the rotor. In some cases, the zero-crossing point of a counter electromotive force induced in each stator winding may not be properly detected eternally, so that such a problem has been further pointed out that the switching operation from the starting mode to drive the rotor by commutating the stator windings forcibly and successively to the normal position detecting mode to drive the rotor by detecting the zero-crossing point of each counter electromotive force is difficult to do properly.

In addition, in these brushless DC motors according to the prior art as described above, an electric current flowing to the stator windings for driving is made of a rectangular wave signal with a conducting width of about 120° in terms of electrical angle. As a result, in order to reduce a spike voltage induced accompanied with the phase-commutation operation, a filter circuit including a comparatively large capacitor is practically required to be provided at across the terminals of the stator windings. Also, an electric current flowing to the stator windings is subjected to an ON-OFF operation in an abrupt manner, so that such a problem further arises in that vibration and noise can be easily generated when starting and such a trend is accelerated as the rotational speed of the motor is increased.

SUMMARY OF THE INVENTION

In consideration of the above-mentioned problems, an object of this invention is to provide a brushless DC motor which has a good starting characteristic without using a special starting circuit in spite of no need to use a position sensor.

Another object of this invention is to provide a brushless DC motor of the full wave driving method in which an electric current can be supplied bidirectionally to each of the stator windings thereof.

A further object of this invention is to provide a brushless DC motor which does not need to have a filter circuit including a large capacitor which is necessary in a brushless DC motor according to the prior art shown above and which can reduce the vibration and noise generation even when rotating at a high speed.

In order to attain the above-mentioned objects, a brushless DC motor of this invention comprises a plurality of stator windings, a counter electromotive force detecting circuit for detecting zero-crossing points of a counter electromotive force selected in response to a selection signal from counter electromotive forces respectively induced in said plurality of stator windings in a successive manner to generate a pulse signal train, a pulse generating circuit for generating a delay pulse signal delayed by a time proportional or approximately proportional to a period of the pulse signal train thus obtained when it is within a specific range or generating a pseudo output pulse signal when it exceeds the specific range, a logical pulse generating circuit for generating multi-phase signals in response to the pseudo output pulse signal and the pulse signal train outputted from said counter electromotive force detecting circuit, a selection signal generating circuit for generating multi-phase selection signals in response to the delay pulse, a position signal forming circuit for forming a position signal of a rotor from an output pulse from said logical pulse generating circuit, and a power supplying circuit for supplying an electric power to said plurality of stator windings in response to the position signal thus formed.

With the brushless DC motor of this invention structured as above, the counter electromotive force detecting circuit detects only zero-crossing points of counter electromotive forces induced into the stator windings, so that in spite of no need to use a position sensor such as a Hall effect sensor, a brushless DC motor based on the full wave driving method in which an electric current is supplied bidirectionally to each of the stator windings can be easily provided. As a result, as compared with a motor based on the half wave driving method in which an electric current is supplied unidirectionally to each of the stator windings, a motor which is outstandingly superior in utility and efficiency of the stator windings as well as in torque to be developed can be provided.

In addition, since it is unnecessary to use a rotor position sensor as would be used in conventional brushless DC motors, a brushless DC motor of this invention makes it possible to eliminate a sophisticated setting position adjustment of a position sensor and to reduce the number of windings, resulting in a vast reduction in cost.

Further in addition, it is unnecessary to provide a position sensor in the motor, so that no structural limitation can be imposed thereupon, largely contributing to the possibility of making it small in size and thickness.

Also, in a brushless DC motor of this invention, even if the counter electromotive force detecting circuit does not output a pulse signal train when starting, the pulse generating circuit outputs a pseudo output pulse to commutate the conducting phases of the stator windings in a successive manner. As a result, even if a special starting circuit is not provided, such a pseudo output pulse commutates the conducting phases of the stator windings in a successive manner. When the counter electromotive force detecting circuit detects zero-crossing points of counter electromotive forces, the switching operation can be rapidly achieved from the starting mode to drive the rotor by commutating the stator windings forcibly and successively to the normal mode to drive it by detecting the zero-crossing points of counter electromotive forces induced in the stator windings. In addition, when starting the motor, the commutation of the conducting phases is not carried out at a constant period of time but at different periods of time, which makes sure that the counter electromotive force detecting circuit detects the zero-crossing points of counter electro-motive forces. As a result, the switching operation from the starting mode to the normal mode can be positively achieved. Thus, a starting characteristic compatible to that obtained in conventional motors having a rotor position sensor can be provided.

In addition, a brushless DC motor of this invention additionally uses a selection circuit in which only a counter electromotive force to be induced in a subsequently detected conducting phase is converted into the pulse signal train in response to the conducting state of the starter windings. As a result a malfunction of phase commutation due to a detection error of the zero-crossing points of counter electromotive forces does not occur, resulting in always obtaining a stable drive.

Further in addition, the phase commutation of an electric current supplied to each stator winding can be carried out extremely smoothly, so that the electric current flowing into a stator winding is not turned ON or OFF abruptly and a filter circuit including a comparatively large capacitor is not necessary across the terminals of the stator windings in order to reduce a spike voltage generated by the phase commutation. As a result, a brushless DC motor having reduced vibration and noise even when rotating at a high speed can be provided.

BRIEF DESCRIPTION OF THE DRAWINGS

FIG. 7 (B) is a diagram showing a signal waveform outputted from each member of the circuit shown in FIG. 6 when starting.

FIG. 9 (B) is a diagram showing a signal waveform outputted from each member of the circuit shown in FIG. 8 when starting.

FIG. 11 (B) is a diagram showing a signal waveform outputted from each member of the circuit shown in FIG. 10 when starting.

DESCRIPTION OF THE PREFERRED EMBODIMENTS

Figure 1:
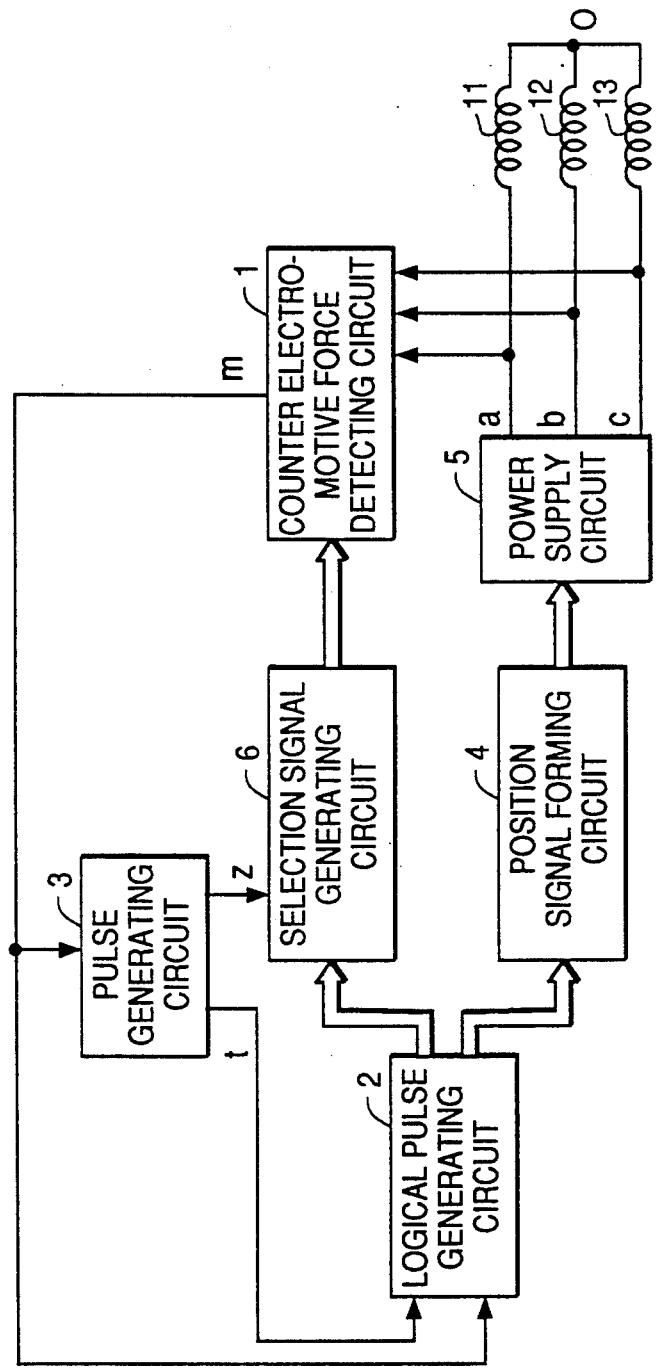
FIG. 1 is a block diagram of a brushless DC motor in accordance with one embodiment of this invention.

Preferred embodiments of this invention will be described below while referring to the drawings.

FIG. 1 is a block diagram of a brushless DC motor in accordance with one embodiment of this invention. In FIG. 1, the reference numeral 1 indicates a counter electromotive force detecting circuit which receives counter electromotive forces respectively induced in three-phase stator windings, 11, 12 and 13 and six-phase selection signals outputted by a selection signal generating circuit 6. The counter electromotive force detecting circuit 1 detects zero-crossing points of the three-phase counter electromotive forces in response to the six-phase selection signals outputted from the selection signal generating circuit 6 to convert them a pulse train m. The pulse train m shows the zero-crossing point of each of the three-phase counter electromotive forces. The pulse train m outputted from the counter electromotive force detecting circuit 1 is inputted to a logical pulse generating circuit 2 and a pulse generating circuit 3. The logical pulse generating circuit 2 frequency-divides the pulse train m outputted from the counter electromotive force detecting circuit 1 and outputs six-phase pulse signals having the same frequency as that of the counter electromotive forces induced in the stator windings 11, 12 and 13. The pulse generating circuit 3 first measures a period of the pulse train m, and then delays its output pulse by a period of time approximately half the period thus measured and outputs it as a delay pulse z to the selection signal generating circuit 6. In addition, when the period thus measured exceeds a specific range, the pulse generating circuit 2 outputs a pseudo output pulse t to the logical pulse generating circuit 2. The six-phase pulse signals generated by the logical pulse generating circuit 2 are sent to a position signal forming circuit 4 for converting them into rotational position signals of a permanent magnet rotor 27. These position signals are sent to a power supply circuit 5 for supplying an electric power to the stator windings 11, 12 and 13. The power supplying circuit 5 supplies an electric current bidirectionally to each of the stator windings 11, 12 and 13 in a successive manner in response to a position signal outputted from the position signal forming circuit 4.

With the structure shown above, the operation of a brushless DC motor of this invention will be explained in detail below.

Figure 2:
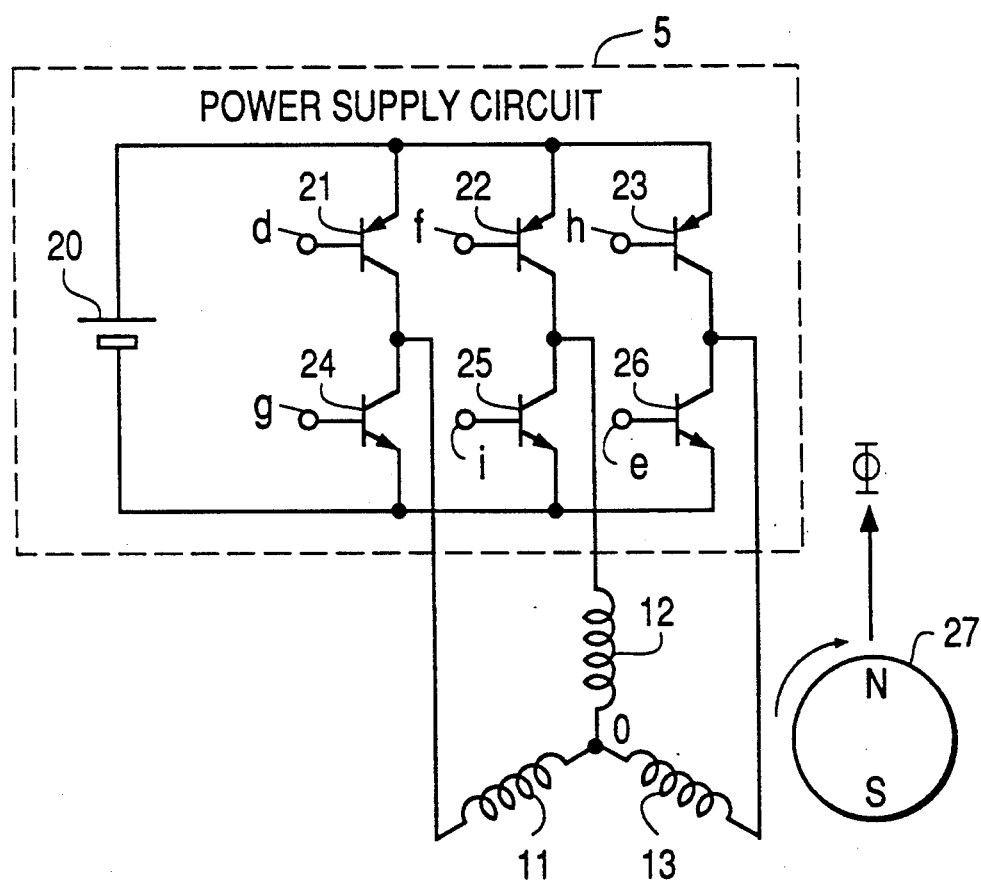
FIG. 2 is a circuit diagram of a motor and a power supplying circuit shown in FIG. 1.

FIG. 2 is a circuit diagram of a power supply circuit 5 shown in FIG. 1. In FIG. 2, the reference numeral 27 indicates a permanent magnet rotor elements 11, 12 and 13 each are stator windings, 21, 22, 23, 24, 25 and 26 each are driving transistors for supplying an electric power to each of the stator windings 11, 12 and 13 based on the ON-OFF operation thereof. Of these transistors, 21, 22 and 23 are PNP transistors, and 24, 25 and 26 NPN transistors. The reference numeral 20 indicates a power source. A brushless DC motor is generally driven by applying the six-phase position signals obtained in response to a rotational position of the rotor 27 respectively to the bases of the driving transistors 21, 22, 23, 24, 25 and 26. First, the transistors 21 and 25 are energized to cause an electric current to flow to the stator windings 11 and 12. Next, the transistors 21 and 26 are energized to cause an electric current to flow to the stator windings 11 and 13. The phases are successively commutated as shown above so as to thereby rotate the permanent magnet rotor 27.

Figure 3:
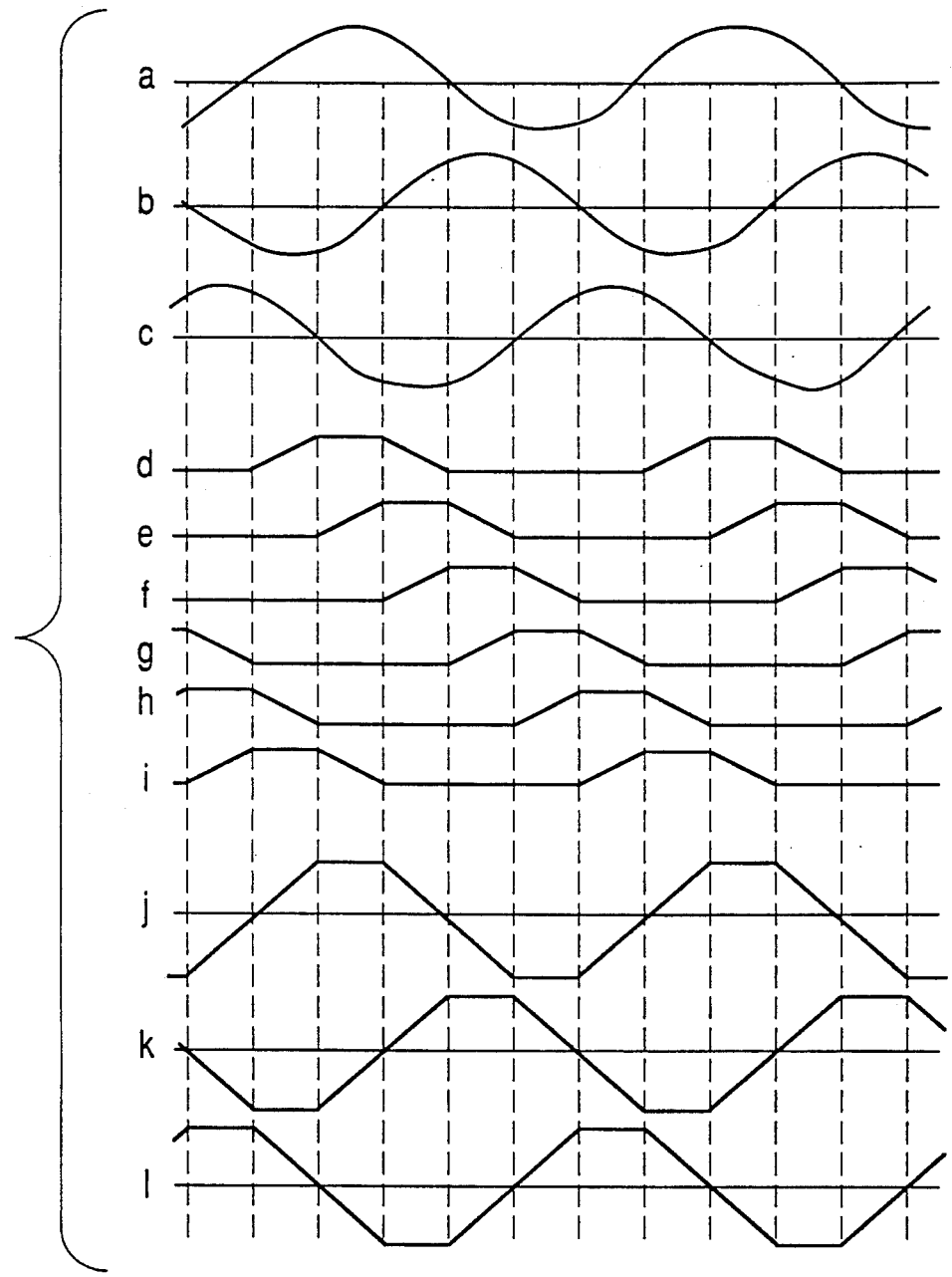
FIG. 3 is a diagram showing a signal waveform outputted from each member of the circuit shown in FIG. 2.

FIG. 3 shows a signal waveform outputted from each member of the circuit 5 shown in FIG. 2.

In FIG. 3, a, b and c show waveforms of the counter electromotive forces induced in the stator windings 11, 12 and 13, respectively, and d, e, f, g, h and i show six-phase signals formed by the position signal forming circuit 4, being equivalent to the six-phase position signals obtained in response to a rotational position of the rotor 27. These signals are trapezoidal in waveform, and the method of obtaining such a trapezoidal waveform signal will be explained in detail later when the position signal forming circuit 4 is described by referring to FIGS. 15 and 16.

Each of the six-phase position signals d. e, f, g. h and i is inputted to a corresponding one of the driving transistors 21, 22, 23, 24, 25 and 26. In this case, however, for each of the PNP transistors 21, 22 and 23, the signal is applied to its base in the direction that an electric current is to be take out and on the other hand, for each of the NPN transistors 24, 25 and 26, it is applied to its base in the direction that it is to be taken in. The base current applied to each transistor is amplified so as to thereby cause an electric current which proportional to each base current to flow to a corresponding collector. As a result, the electric currents as shown in FIG. 3 at j, k and 1 are supplied bidirectionally to the stator windings 11, 12 and 13, respectively. The phases are commutated in a successive manner as shown above for rotating the permanent magnet rotor 27.

Explanations will be further made on the signal processing operation of each member of this embodiment.

Figure 4:
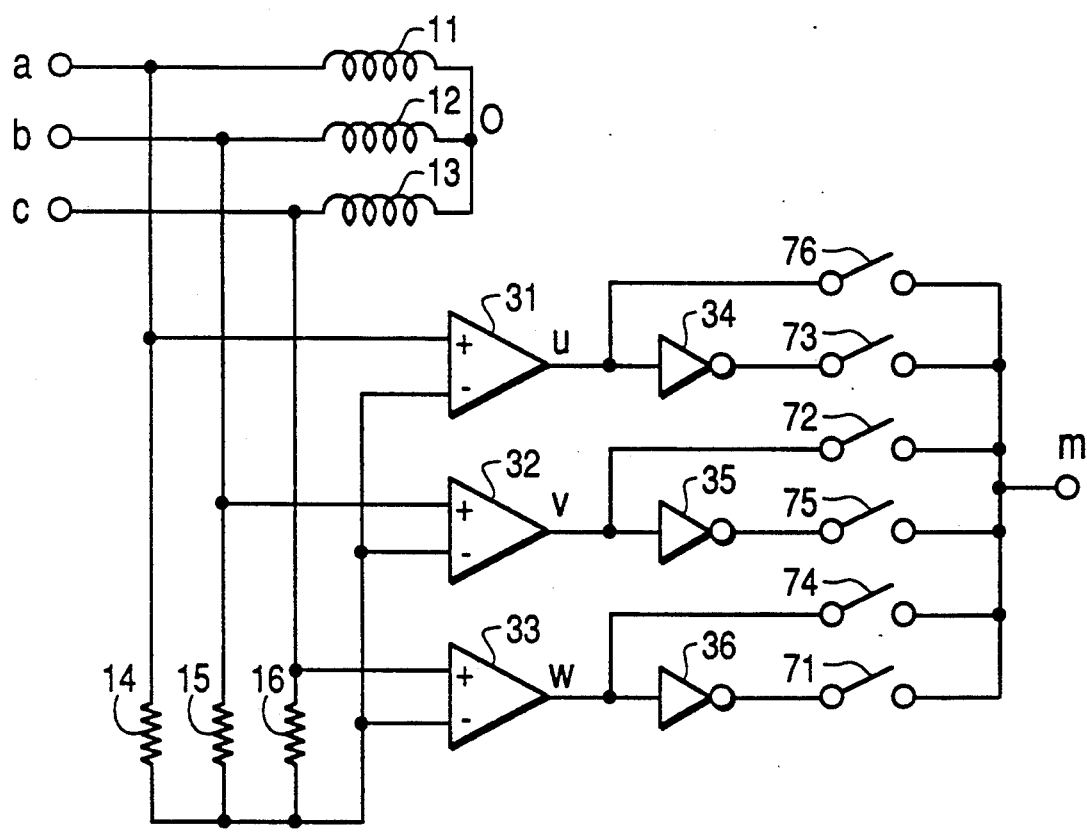
FIG. 4 is a circuit diagram of a counter electromotive force detecting circuit shown in FIG. 1.

FIG. 4 is a circuit diagram of a counter electromotive force detecting circuit 1 shown in FIG. 1.

In FIG. 4, the reference numerals 14, 15 and 16 each indicates a resistor having one terminal which is connected a corresponding one of the stator windings 11, 12 and 13 and having another terminal which is connected to a common connecting point, reference numerals 31, 32 and 33 each indicates a comparator having one input terminal (+) which is connected to a corresponding one of the stator windings 11, 12 and 13 and having another input terminal (−) which is connected to the common connecting point of the resistors 14, 15 and reference numerals 16, and 34, 35 and 36 each indicates an inverter. The inverters 34, 35 and 36 have their input terminals connected to the output terminals of the comparators 31, 32 and 33, respectively. The reference numerals 71, 72, 73, 74, 75 and 76 each indicates a switch. Of these switches, the switches 71, 73 and 75 have one end connected to the output terminals of the inverters 36, 34 and 35, respectively. The switches 72, 74 and 76 have one end connected to the output terminals of the comparator 32, 33 and 31, respectively. The switches 71, 72, 73, 74, 75 and 76 have their other ends connected to a common connection to provide the output terminal of the counter electromotive force detecting circuit 1.

Figure 5:
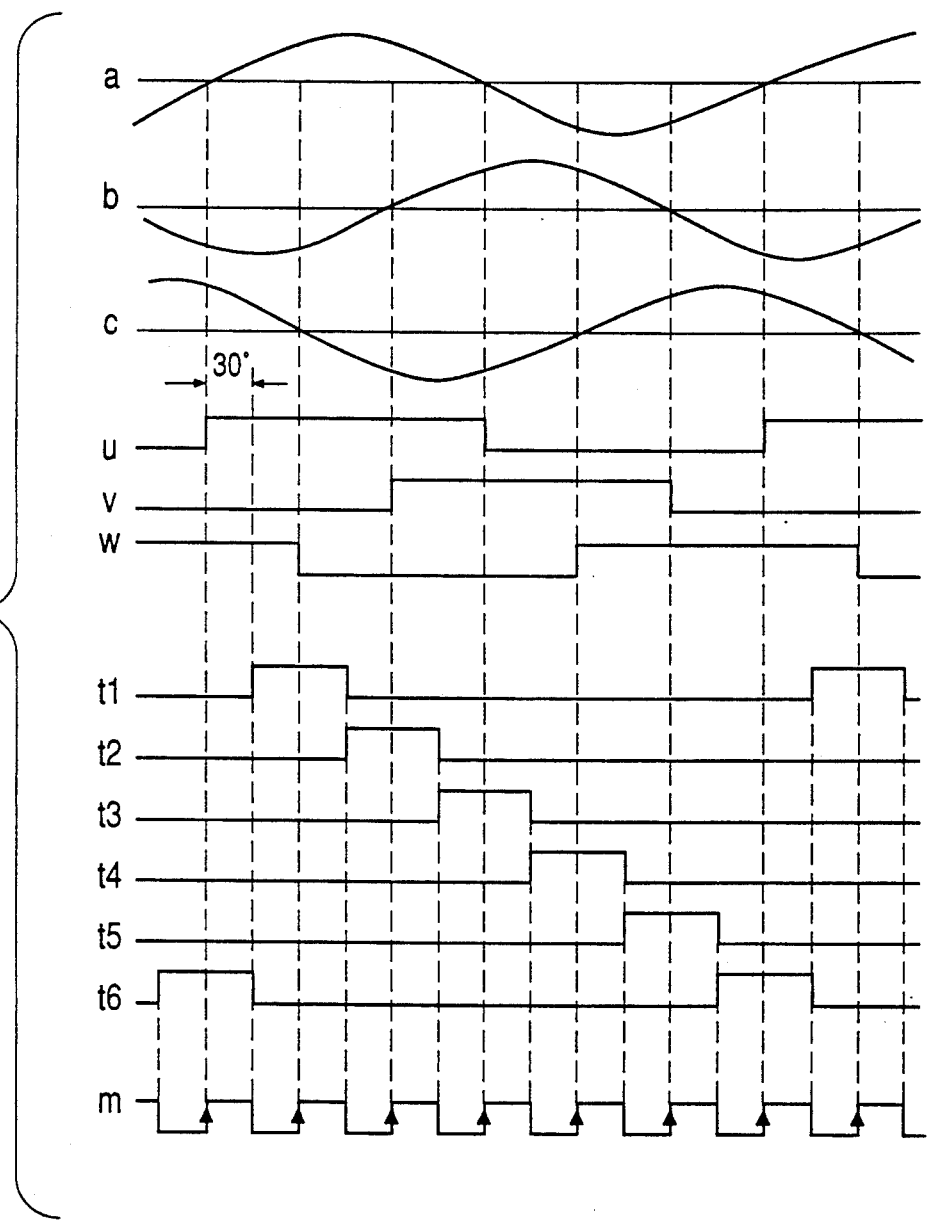
FIG. 5 is a diagram showing a signal waveform outputted from each member of the circuit shown in FIG. 4.

The operation of the counter electromotive force detecting circuit 1 shown in FIG. 4 will be explained below while referring to FIG. 5.

The resistors 14, 15 and 16 are respectively connected to the stator windings 11, 12 and 13, so that the same electric potential as that of the neutral point O of the stator windings 11, 12 and 13 can be obtained at the common connecting point of the resistors 14, 15 and 16. As a result, as to the motor, there is no need to take out a signal line specifically from the neutral point of the stator windings 11, 12 and 13. The counter electromotive forces induced in the stator windings 11, 12 and 13 respectively become signal waveforms as shown at a, b and c of FIG. 5. These counter electromotive forces a, b and c are respectively inputted to the input terminals (+) of the comparators 31, 32 and 33 shown in FIG. 4 and the electric potential of the neutral point of the stator windings 11, 12 and 13 obtained at the common connecting point of the resistors 14, 15 and 16 is input-
ted to the input terminals (−) of them. Thus, from the output terminals of the comparators 31, 32 and 33, pulse signals having waveforms as shown at u, v and w of FIG. 5 can be respectively obtained by wave-shaping the counter electromotive forces a, b and c. The pulse edges of the waveforms u, v and w respectively coincide with the zero-crossing points of the counter electromotive forces a, b and c. In FIG. 5, t1, t2, t3, t4, t5 and t6 are six-phase signals outputted from the selection signal generating circuit 3 to the counter electromotive force detecting circuit 1, which show selection signal waveforms whose rising edges are delayed by approximately 30° in terms of electrical angle from the timing of the zero-crossing points of the counter electromotive forces a, b, and c. The switches 71, 72, 73, 74, 75 and 76 are switched ON when these selection signals are at an "H" (high level) and switched OFF when they are at an "L" (low level). As a result, a signal waveform as shown at m of FIG. 5 is obtained from the common connecting point of the switches 71, 72, 73, 74, 75 and 76, so that a pulse train m which has a pulse signal waveform whose rising edges coincide with the zero-crossing pints of the counter electromotive forces a, b and c can be outputted. That is, a pulse is outputted at each of the zero-crossing points of the counter electromotive forces a, b and c so as to thereby output a pulse train m having six pulses (by 60° in terms of electrical angle) per period of each of the counter electromotive forces a, b and c.

Next, the operation of a pulse generating circuit 3 shown in FIG. 1 will be explained in detail.

Figure 6:
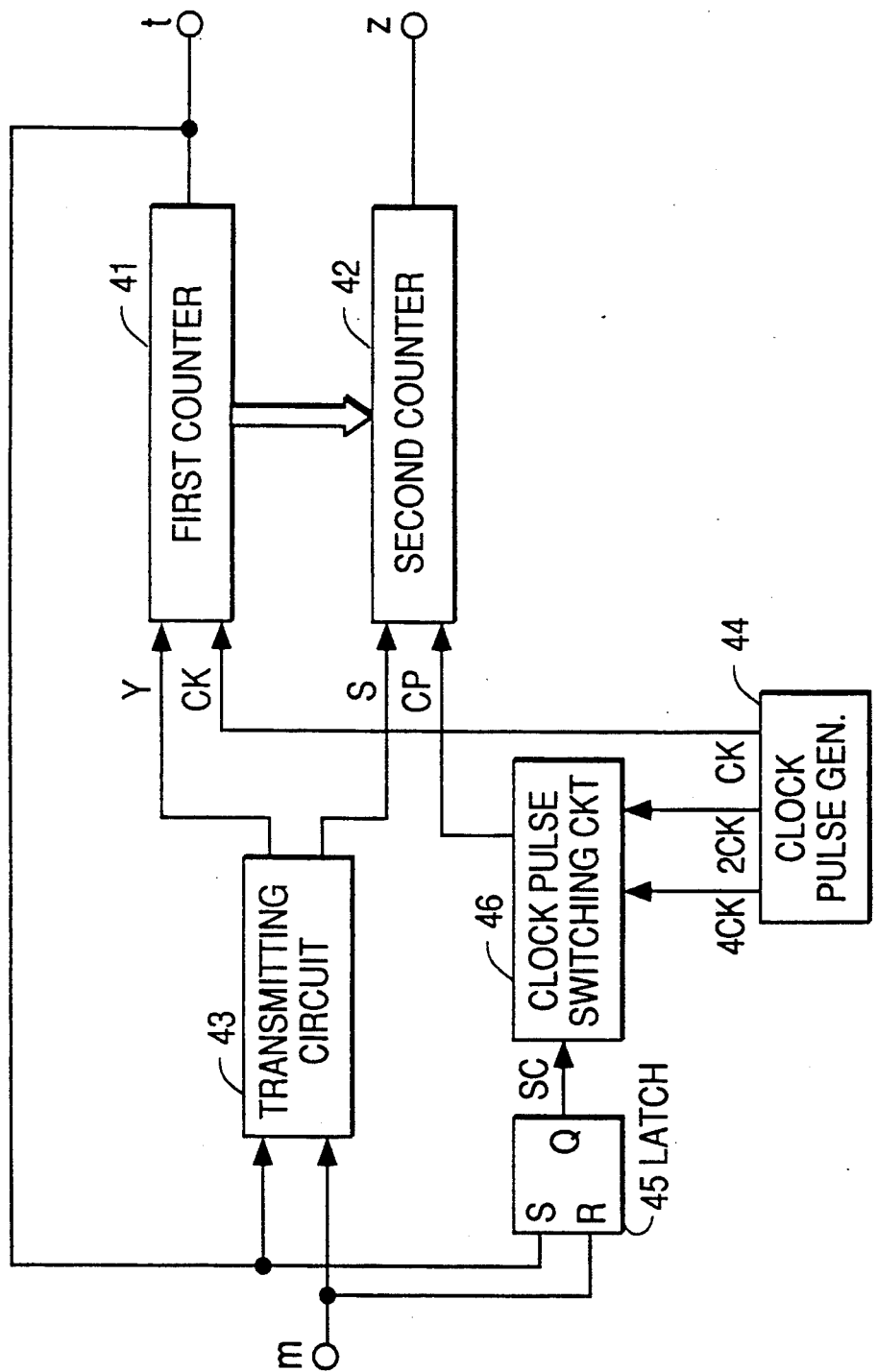
FIG. 6 is a circuit diagram of a pulse generating circuit shown in FIG. 1.
Figure 7A:
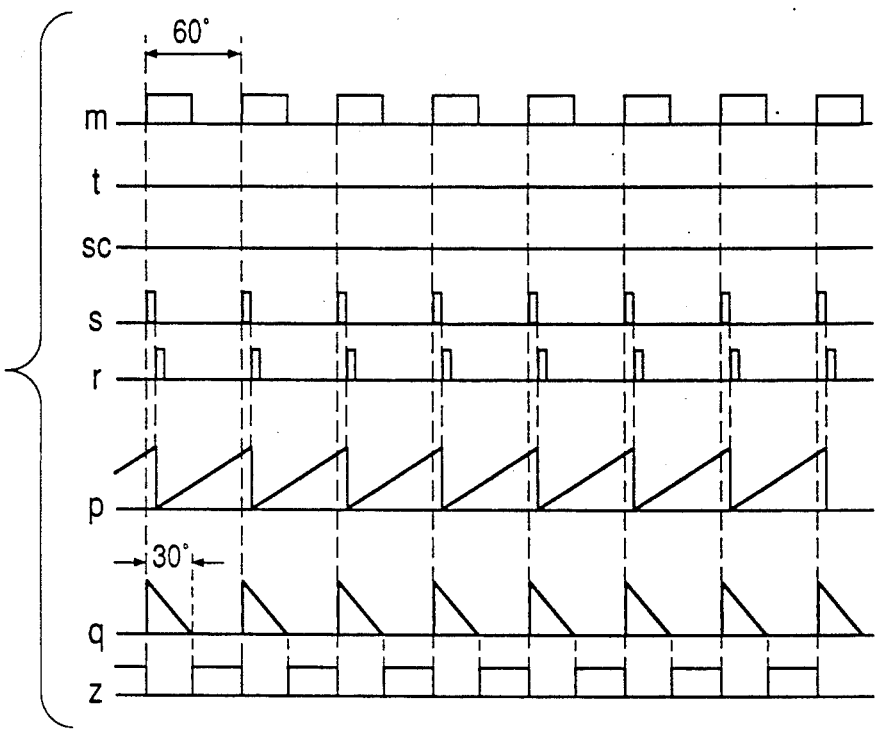
FIG. 7 (A) is a diagram showing a signal waveform outputted from each member of the circuit shown in FIG. 6 when rotating normally.
Figure 7B:
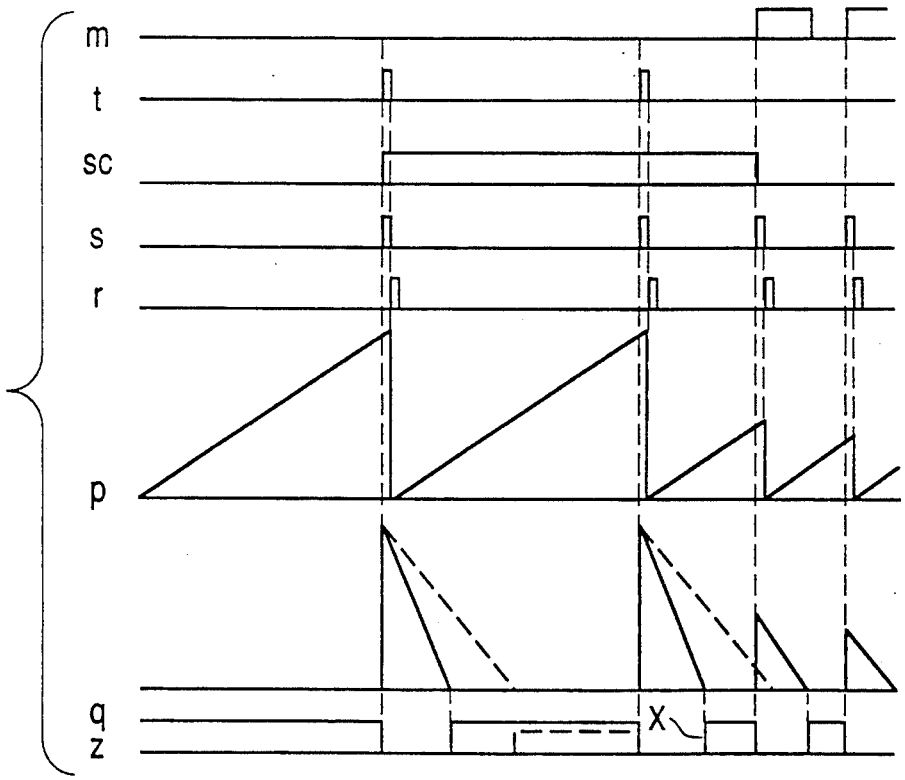

FIG. 6 is a circuit diagram of a pulse generating circuit 3 shown in FIG. 1, FIG. 7 (A) is a diagram showing a signal waveform outputted from each member of the circuit shown in FIG. 6 when rotating the motor normally and FIG. 7 (B) a diagram showing a signal waveform outputted from each member of the circuit shown in FIG. 6 when starting the motor.

In FIG. 6, the reference numeral 41 indicates a first counter, 42 a second counter and 44 a clock pulse generating circuit. The first counter 41 outputs a carry flag t when its count value overflows and the second counter 42 outputs a zero flag z when its count value becomes zero. The reference numeral 43 indicates a transmitting circuit to receive the pulse train m outputted from the counter electromotive force detecting circuit 1 and the pulse signal t outputted from the first counter 41. The transmitting circuit 43 outputs a reset pulse r to the first counter 41 for resetting the count value thereof and a load pulse s to the second counter 42 for loading the count value of the first counter 41. The reference numeral 45 indicates a latch circuit whose set terminal s receives the pulse signal t outputted from the first counter 41 and whose reset terminal R receives the pulse train m outputted from the counter electromotive force detecting circuit 1. An output terminal Q of the latch circuit 45 outputs a switching signal sc to a clock pulse switching circuit 46. The clock pulse generating circuit 44 generates three kinds of clock pulses, ck, 2ck (meaning that its clock frequency is twice that of the clock pulse ck) and 4ck (meaning that its clock frequency is quadruple that of the clock pulse ck). The clock pulse ck is sent to the first counter 41, the clock pulses 2ck and 4ck are sent to the clock pulse switching circuit 46. The clock pulse switching circuit 46 selects either clock pulse 2ck or 4ck in response to the inputted switching single sc to output it to the second counter 42 as a clock signal cp. In addition, the zero-flag z outputted from the second counter 42 corresponds to the delay pulse z inputted to the selection signal generating circuit 6, and the pulse t outputted from the first counter 42 corresponds to the pseudo output pulse t inputted to the logical pulse generating circuit 3.

The operation of the pulse generating circuit 3 shown in FIG. 6 when a motor is being rotated normally will be explained below by referring to FIG. 7 (A). As shown at m and t of FIG. 7 (A), the counter electromotive force detecting circuit 1 outputs a pulse train m of a constant interval and the first counter 41 does not output the pulse t, so that an output signal form the Q output terminal of the latch circuit 45 can be reset and the switching signal sc is allowed to remain as an "L" (low level) as shown in FIG. 7 (A). When the switching signal sc is an "L", the clock pulse switching circuit 46 selects the clock pulse 2ck so as to thereby send it to the second counter 42 (cp=2ck). The first counter 41 continues to up-count the clock pulse ck until the reset pulse r outputted from the transmitting circuit 43 is received. Since the reset pulse r has the same frequency as that of the pulse train m outputted from the counter electromotive force detecting circuit 1, the count value of the first counter 41 results in counting the period of the pulse train m outputted from the counter electromotive force detecting circuit 1. Such a state as shown above is analogically shown at p of FIG. 7 (A). The count value p of the first counter 41 is transmitted to the second counter 42 at the timing of the load pulse s outputted from the transmitting circuit 43. The second counter 42 down-counts the count value p obtained by measuring the period of the pulse train m with the clock pulse 2ck, so that the count value can be made zero at the middle point of the pulse train of the load pulse s (or the rising edge of the pulse train m). Such a state as shown above is shown analogically at q of FIG. 7 (A). The second counter 42 outputs a zero flag signal when the count value is zero, so that it can output a delay pulse z as shown at z of FIG. 7 (A). The rising edges of the pulse train m outputted from the counter electromotive force detecting circuit 1 indicate zero-crossing points of the counter electromotive forces a, b and c respectively induced in the stator windings 11, 12 and 13, so that the interval of the pulse train s outputted at the rising edges of the pulse train m is equivalent to an electrical angle of 60°. As a result, the pulse signal z shown in FIG. 7 (A) has rising edges just delayed by 30° in terms of electrical angle from zero-crossing points of the counter electromotive forces a, b and c, being outputted as a delay pulse signal to the selection signal generating circuit 6. In addition, between the phase of the load pulse signal s and that of the reset pulse signal r, there exists a relationship as shown in FIG. 7 (A). The fact that the reset pulse r is delayed in phase from the load pulse insures the transmitting of the count value of the first counter 41 to the second counter 42. Also, referring to the drawings, a pulse width of each of the pulses s and r is made large for the sake of convenience, but it is sufficiently small as compared with the pulse period.

Next, the operation of the pulse generating circuit 3 when the motor is to be started will be explained below by referring to FIG. 7 (B). The first counter 41 continues to count the clock pulse ck until the reset pulse r outputted from the transmitting circuit 43 is received. In this case, however, the rotor remains stationary, so that the counter electromotive force detecting circuit 1 does not output the pulse train m. As a result, the count value of the first counter 41 is monotonously increased as shown at p of FIG. 7 (B) and when the count value overflows, the first counter 41 outputs a pulse signal t to the transmitting circuit 43 and the latch circuit 45. The transmitting circuit 43 receives the pulse signal t and outputs the reset pulse signal r and load pulse signal s. The pulse signal t is inputted to the set terminal s of the latch circuit 45, so that the switching signal sc outputted from the latch circuit 45 becomes an "H" (high level) as shown at sc of FIG. 7 (B). When the switching signal sc becomes an "H", the clock pulse switching circuit 46 selects the clock pulse 4 ck from the clock pulse generating circuit 44 so as to thereby send it to the second counter 42 (cp=4ck). The second counter 42 loads the initial value with the load pulse s and down-counts the count value and when the count value thus down-counted becomes zero, outputs the zero flag z as a delay pulse to the selection signal generating circuit 6. Also, the carry flag t is outputted to the logical pulse generating circuit 2 as a pseudo output pulse. When the motor is to be started, the counter electromotive force detecting circuit 1 does not output the pulse train m and the pseudo output signal t substitutionally becomes a pseudo signal for successively operating the phase commutation of the stator windings 11, 12 and 13. As a result, the permanent magnet rotor 27 is started to rotate by means of this pseudo output pulse signal t. When the pulse train m is outputted from the counter electromotive force detecting circuit 1, as shown in FIG. 7 (B), the latch circuit 45 is reset by the pulse train m and the switching signal sc outputted therefrom becomes an "L". In this case, however, suppose that the second counter 42 down-counts the inputted clock pulse which remains as 2ck. The count value of the second counter 42 becomes as shown by the dotted line at q of FIG. 7 (B). As clear from the waveform shown by the dotted line in FIG. 7 (B) q, before the second counter 42 down-counts the clock pulse and the count value thus down-counted becomes zero, such that the count value of the first counter 41 is further transmitted thereto. In such a case, the count value of the second counter 42 does not become zero, and thus the delay pulse z is not outputted. Accordingly, a pulse x as shown in FIG. 7 (B) z is not generated, so that even if the phase commutating operation of the stator windings 11, 12 and 13 is forcibly carried out by the pseudo output pulse t, the selection signal generating circuit 6 cannot output a selection signal of a phase a zero-crossing point of the counter electromotive force, and smooth acceleration of the motor cannot be expected. Then, the pulse generating circuit 3 is structured such that when the transmitting circuit 43 receives the pulse signal t, a clock pulse outputted from the clock pulse switching circuit 46 to the second counter 42 is switched from 2ck to 4ck. As a result, the initial value sent to the second counter 42 is down-counted with the clock pulse of 4ck, and the count value becomes zero in a time half that obtained when down-counted with the clock pulse of 2ck. This is shown by the continuous line at q of FIG. 7 (B). As a result, such a case that the count value of the first counter 41 is further transmitted to the second counter 42 before the count value of the second counter 42 becomes zero. This means that as the waveform shown by the continuous line in FIG. 7 (B) q, the count value of the second counter 42 surely becomes zero to output the delay pulse signal z. Then, the second counter 42 outputs the delay pulse signal z as shown in FIG. 7 (B) under the same condition as in the normal rotation of the motor explained above. The delay pulse signal z is sent to the selection signal generating circuit 6 and through the power supply circuit 5, the conducting phase between the three-phase stator windings 11, 12 and 13 is commutated in a successive manner. Thus, the motor is smoothly accelerated, resulting in obtaining good starting characteristic of the motor.

Figure 8:
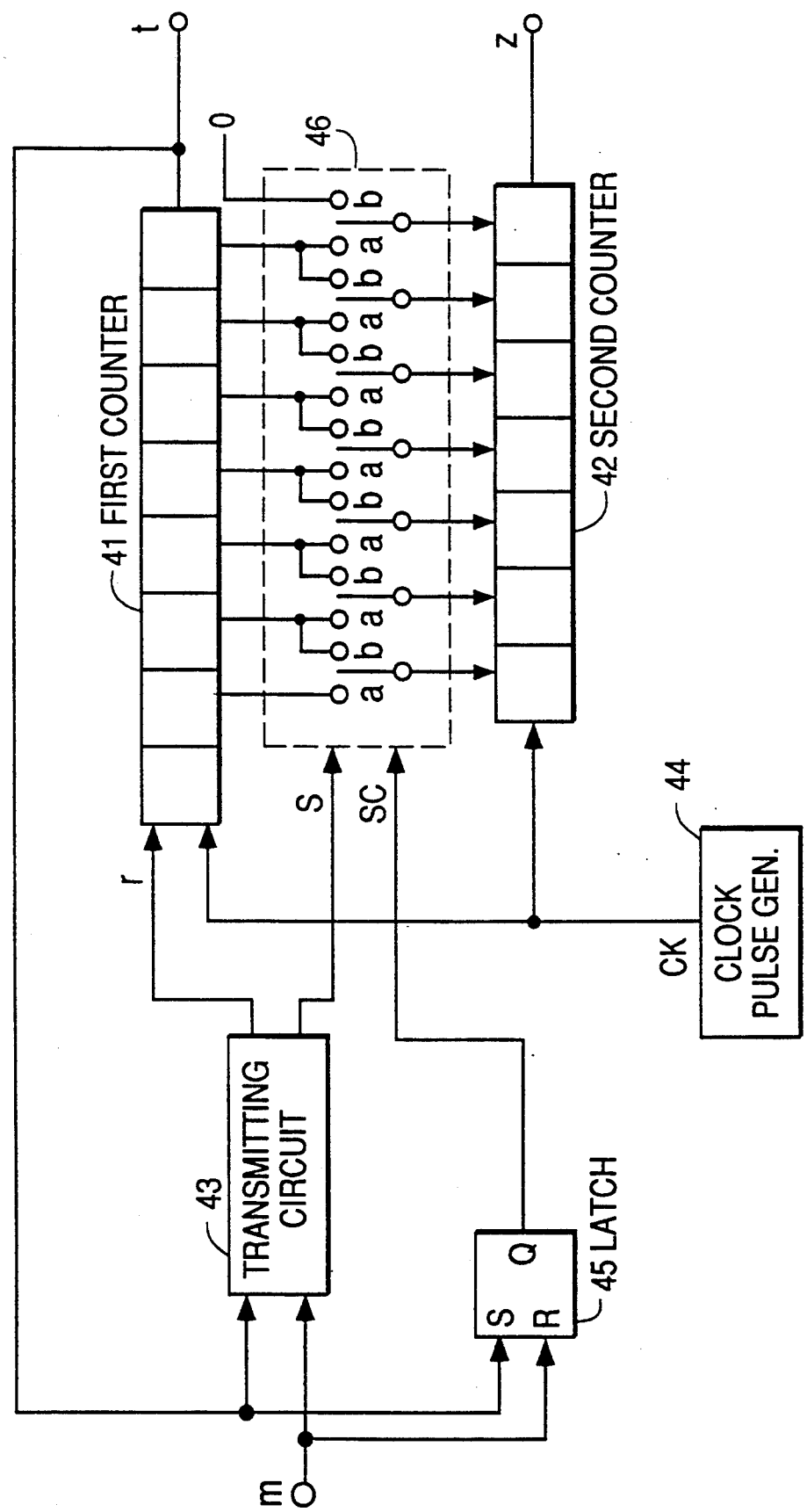
FIG. 8 is a circuit diagram of a pulse generating circuit showing another example of that shown in FIG. 1.
Figure 9A:
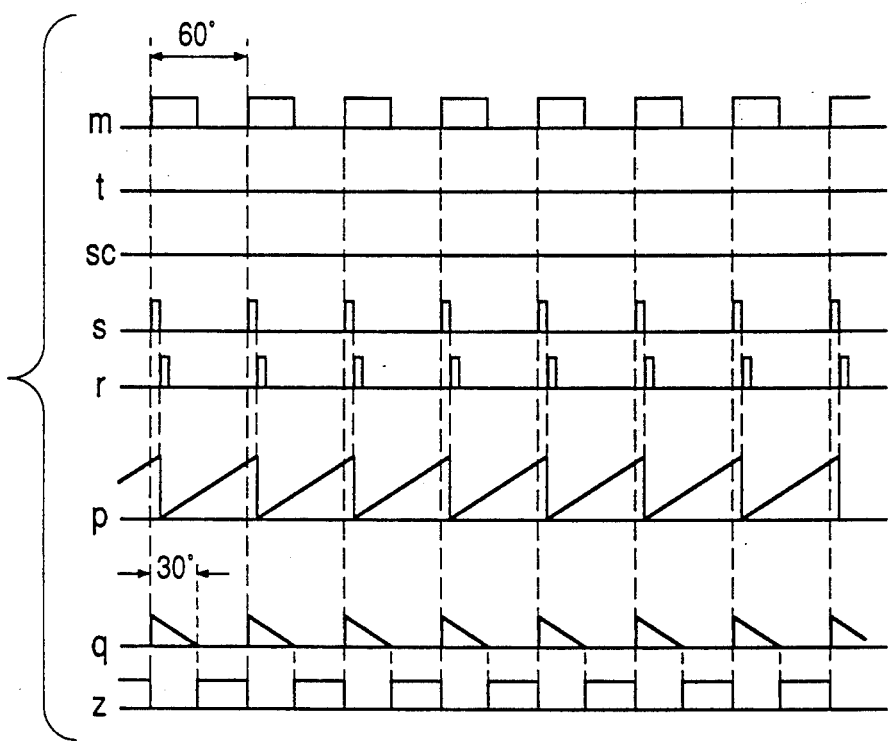
FIG. 9 (A) is a diagram showing a signal waveform outputted from each member of the circuit shown in FIG. 8 when rotating normally.
Figure 9B:
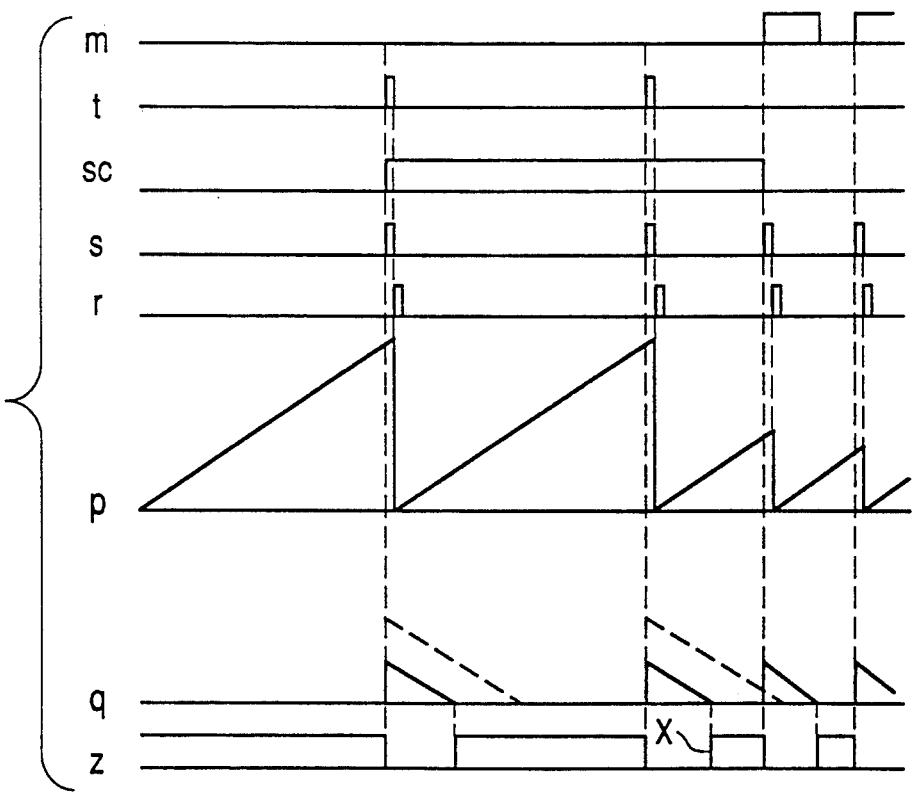

FIG. 8 is a circuit diagram of a pulse generating circuit showing another example of the pulse generating circuit 3 shown in FIG. 1. A waveform of an output from each member of the circuit shown in FIG. 8 when a motor is being rotated normally is shown in FIG. 9 (A) and that when it is to be started is shown in FIG. 9 (B). In this case, elements having the same functions as those of elements shown in FIG. 6 have the same reference numerals and their explanations are omitted for the sake of eliminating duplication.

In FIG. 8, a first counter 41 is an eight-bit digital counter and a second counter 42 is a seven-bit digital counter. The first counter 41 and second counter 42 have the same clock ck inputted thereto. The reference numeral 46 indicates a switch transmitting circuit consisting of seven switches and connected to either contact point a or b for only a small period of time by a load pulse signal s outputted from a transmitting circuit 43. Also to the switch transmitting circuit 46 is inputted a switching signal sc outputted from a latch circuit 46, and when the load pulse s is inputted under such a state that the switching signal sc is an "L", the switch transmitting circuit 46 is connected to the contact point a, and when the signal so sc is an "H", the circuit 46 is connected to the contact point b. When the switch transmitting circuit 46 is connected to the contact point a, bits excepting the least significant bit of the count value of the first counter 41 (upper 7 bits in an example shown in FIG. 8) are sent to the second counter 42. Also, when the switch transmitting circuit 46 is connected to the contact point b, bits excepting 2 bits from the least significant bit of the count value of the first counter 41 (upper 6 bits in the example shown in FIG. 8) are sent to the second counter 42 and to the most significant bit of the second counter 42 is sent "O".

The operation of the pulse generating circuit shown in FIG. 8 when a permanent magnet rotor 27 is being rotated normally will be explained by referring to FIG. 9 (A).

When a motor is under the normal rotational condition, a Q output signal of the latch circuit 45 is reset and the switching signal sc remains an "L" as shown in FIG. 9 (A). As a result, the switch transmitting circuit 46 is connected to the contact point a when the load pulse s is inputted, so that bits excepting only the least significant bit of the count value p of the first counter 41 are sent to the second counter 42. Thus, a value equal to half the count value p of the first counter 41 is fed to the second counter 42 as the initial value. As a result, the second counter 42 down-counts the value of p/2 equivalent to half of the count value obtained by counting the period of the pulse train m with the clock pulse of ck, so that the count value becomes zero at the middle point of the pulse train of the load pulse s (or at the rising edges of the pulse train m). Such a state is shown analogically at q of FIG. 9 (A). The second counter 42 outputs a zero flag signal when the count value of the second counter 42 becomes zero, and outputs a delay pulse signal z as shown at z of FIG. 9 (A).

Next, the operation of the pulse generating circuit shown in FIG. 8 when a motor is to be started will be explained by referring to FIG. 9 (B). When to be started, the counter electromotive force detecting circuit 1 does not output the pulse train m and the first counter 41 continues to up-count the clock pulse ck. As a result, the count value of the first counter 41 is monotonously increased as shown at p of FIG. 9 (B), and when it overflows, the first counter 41 outputs a carry flag t to send to the transmitting circuit 43 and the latch circuit 45. Thus, an output signal from the latch circuit 45 becomes an "H" as shown at sc of FIG. 9 (B). If the load pulse s is inputted under such a state, the switch transmitting circuit 46 is connected to the contact point b, so that to the second counter 42 are sent bits excepting only a bits from the least significant bit of the count value p of the first counter 41. This state is shown by the continuous line at q of FIG. 9 (B). As clear from FIG. 9 (B) q, a value equal to one quarter the count value p of the first counter 41 is fed to the second counter 42 as the initial value. In this case, however, suppose that as shown by the dotted line at q of FIG. 9 (B), when the transmitting circuit 43 receives the pulse signals t, the value of p/2 (upper 7 bits) which is half the count value of the first counter 41 is sent directly to the second counter 42 as the initial value. Then, as clearly seen from the waveform shown by the dotted line in FIG. 9 (B) q, when the motor is started, before the second counter 42 down-counts the initial value to obtain its count value of zero, the count value of the first counter 41 may be further sent to the second counter 42. In such a case, the count value of the second counter 42 does not become zero so as not to output the delay pulse z. As a result, a pulse signal x as shown at z of FIG. 9 (B) is not generated. Therefore, the phase commutating operation cannot be properly carried out between the stator windings, which means that smooth acceleration of the motor cannot be expected. So, when the transmitting circuit 43 receives the carry flag signal t when starting, the value of p/2 which is the half value of the count value of the first counter 41 (in this case, 7 bits excepting the least significant bit thereof) is not sent directly to the second counter 42, but the switch transmitting circuit 45 is connected to the contact pint b for a short period of time during transmission. Thus, the value of p/4 which is one quarter of the count value of the first counter 41 (in this case, the upper 6 bits of the first counter 41) is sent to the second counter 42, which is shown by the continuous line at q of FIG. 9 (B). As a result, the transmission of the count value of the first counter 41 to the second counter 42 before the count value of the second counter 42 becomes zero does not happen. This means that the count value of the second counter 42 surely becomes zero and the zero flag signal z is outputted as a delay pulse signal at the time when it becomes zero. Then, the second counter 42 outputs the delay pulse signal z as shown in FIG. 9 (B) z in the same operation as in the case when the motor is being normally rotated. The delay pulse signal z thus outputted is sent to the selection signal generating circuit 6 and through the power supply circuit 5, the conducting phase commutation of the three-phase stator windings 11, 12 and 13 is operated in a successive manner. Thus, the motor is smoothly accelerated, resulting in obtaining good starting characteristic. In the embodiment shown in FIG. 6, clock frequencies to be supplied to the first and second counters 41 and 42 are different from each other, but in this embodiment shown in FIG. 8, only one kind of clock frequency can be advantageously applied.

Figure 10:
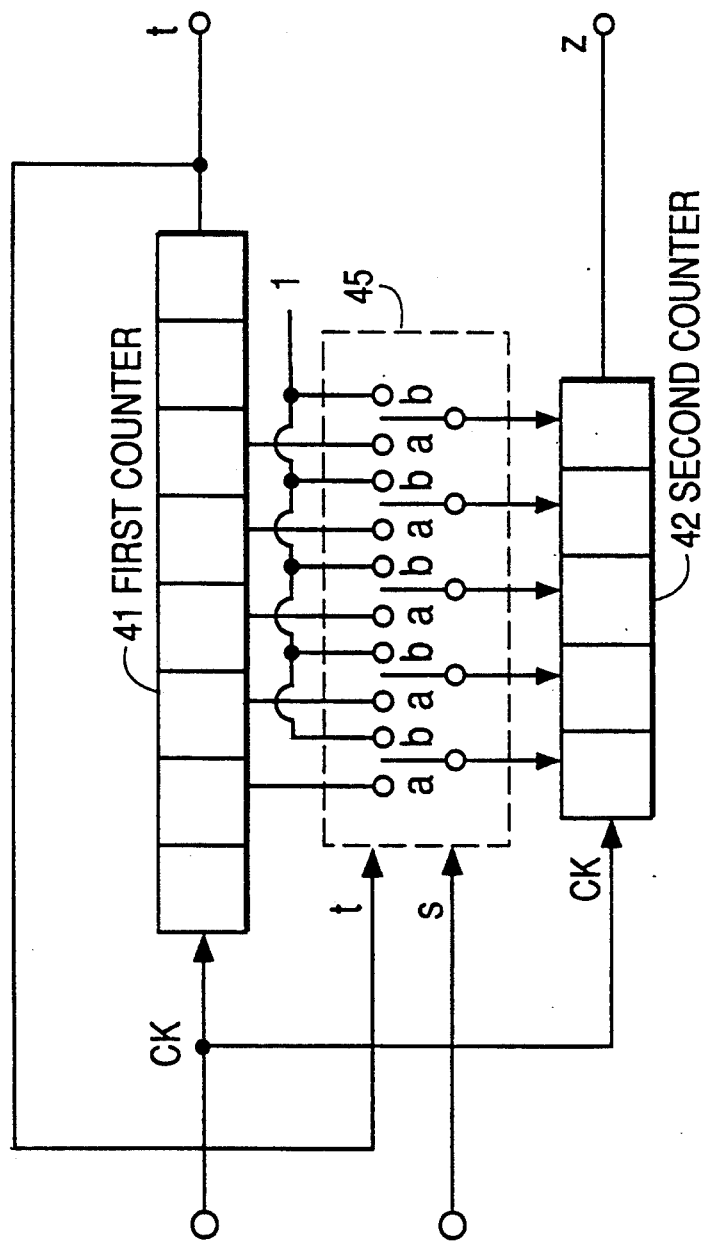
FIG. 10 is a circuit diagram of a pulse generating circuit showing further example of that shown in FIG. 1.
Figure 11A:
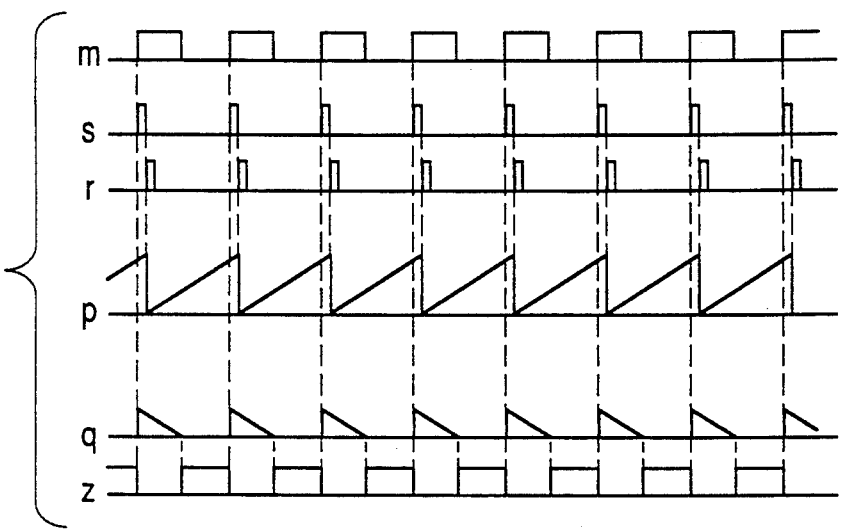
FIG. 11 (A) is a diagram showing a signal waveform outputted from each member of the circuit shown in FIG. 10 when rotating normally.
Figure 11B:
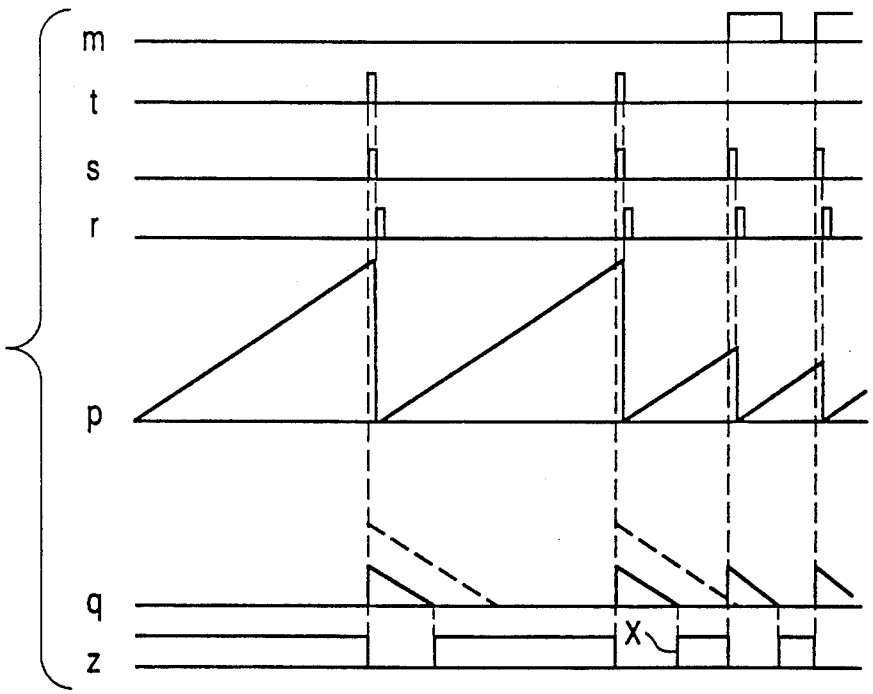

FIG. 10 is a circuit diagram showing the main part of a pulse generating circuit showing further another example of the pulse generating circuit 3 shown in FIG. 1. The waveform of each member of the circuit shown in FIG. 10 when a motor is being normally rotated is shown in FIG. 11 (A) and that when it is to be started is shown in FIG. 11 (B).

In addition, elements having the same functions as those of the elements shown in FIG. 8 have the same reference numerals and their explanations are omitted for the sake of eliminating duplication.

In FIG. 10, a first counter 41 comprises an eight-bit digital counter and a second counter 42 comprises a five-bit digital counter. The first and second counters 41 and 42 have the same clock pulse ck inputted thereto. The first counter 41 up-counts the clock pulse ck and the second counter 42 down-counts the clock pulse ck. A switch transmitting circuit 45 consists of five switches, a transmission circuit 43 (not shown) is connected by a load pulse s to a contact point a for a short period of time, and bits excepting the least significant bit of the count value of the first counter 41 (5 bits in the example shown in FIG. 10) are sent to the second counter 42. Also, when the count value of the first counter 41 overflows and the first counter 41 outputs a carry flag t, the switch transmitting circuit 45 is connected to the contact point b for a short period of time and all bits of the second counter 42 are set to "1".

The operation of the pulse generating circuit shown in FIG. 10 when the permanent magnet rotor 27 is being normally rotated will be explained by referring to FIG. 11 (A).

The count value p of the first counter 41 is sent to the second counter 42 at the timing of the load pulse s outputted from the transmitting circuit 43. In this case, however, bits excepting only the least significant bit of the first counter 41 are sent to the second counter 42, so that as shown at q of FIG. 11 (A), a value equal to one half the count value p of the first counter 41 is sent to the second counter 42 as the initial value. The second counter 42 down-counts the value of p/2, which is equivalent to half the value of the count value obtained by counting the period of the pulse train s, with the clock pulse of ck, so that the count value thus down-counted becomes zero at the middle point of the pulse train s. As a result, the second counter 42 outputs a delay pulse signal z as shown in FIG. 11 (A). This means that the rising edges of the delay pulse signal z are delayed by 30° in terms of electrical angle from the zero-crossing points of the counter electromotive forces a, b and c, as shown in FIG. 11 (A).

Next, the operation of the pulse generating circuit shown in FIG. 10 when the motor is to be started will be explained by referring to FIG. 11 (B). When to be started, the counter electromotive force detecting circuit 1 does not output the pulse train m, so that the first counter 41 continues to up-count the clock pulse ck. As a result, the count value of the first counter 41 is monotonously increased a shown at p of FIG. 11 (B), and when the count value overflows, the first counter 41 outputs the carry flag t to send to the switch transmitting circuit 45 and the transmitting circuit 43 (not shown). The transmitting circuit 43 receives the signal t and outputs the reset pulse r and the load pulse s. The second counter 42 has the initial value loaded by the load pulse s. In this case, however, suppose that the transmitting circuit 43 receives the signal t and the value of p/2 (upper 7 bits) equivalent to one half the value of the count value of the first counter 41 is sent directly to the second counter 42 of the seven-bit counter as the initial value as shown at q of FIG. 11 (B). Then, as clear from the waveform shown by the dotted line in FIG. 11 (B) q, when starting, the count value of the first counter 41 is further sent to the second counter 42 before the second counter 42 down-counts the value of p/2 and its count value becomes zero. In such a case, the count value of the second counter 42 does not become zero, so that the delay pulse z cannot be outputted. As a result, a pulse x as shown at z of FIG. 11 (B) cannot be generated. Therefore, the phase cannot be properly commutated between the stator windings, so that smooth acceleration of the motor cannot be expected.

Accordingly, in case that the motor is to be started, when the transmitting circuit 45 receives the signal t, the value of p/2 equivalent to one half the value of the count value of the first counter 41 (in this case, the upper 7 bits excepting the least significant bit of the count value of the first counter 41) is not sent directly to the second counter 42, but by connecting the switch transmitting circuit 45 to the contact point b for a short period of time, such a predetermined value that is smaller than the value of p/2 equivalent to one half the value of the count value of the first counter 41 (in this case, 5 bits all of which are "1") are sent to the second counter 42. Thus, as already explained above, the count value of the first counter 41 is further sent to the second counter 42 before the count value of the second counter 42 becomes zero. As a result, the count value of the second counter 42 surely becomes zero and outputs the delay pulse z. Then, the second counter 42 outputs the delay pulse z shown at z of FIG. 11 (B) in the same operation as in case when the motor is being normally rotated. The delay pulse z is sent to the selection signal generating circuit 6, thus commutating through the power supply circuit 5 the conducting phases of the three-phase stator windings 11, 12 and 13 in a successive manner. Thus, the motor can be smoothly accelerated, resulting in obtaining good starting characteristic.

In the embodiment shown in FIG. 8, the value of p/4 which is equivalent to one quarter of the count value of the first counter 41 is sent to the second counter 42 when starting. On the other hand, in the embodiment shown in FIG. 10, a predetermined value which is smaller than the value of p/2 (in this case, 5 bits all of which are "1") is sent to the second counter 42 when starting. This means that the number of bits to be sent to the second counter 42 can be advantageously reduced.

Figure 12:
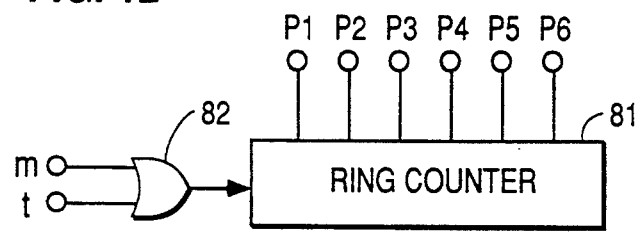
FIG. 12 is a circuit diagram of a logical pulse generating circuit shown in FIG. 1.
Figure 13:
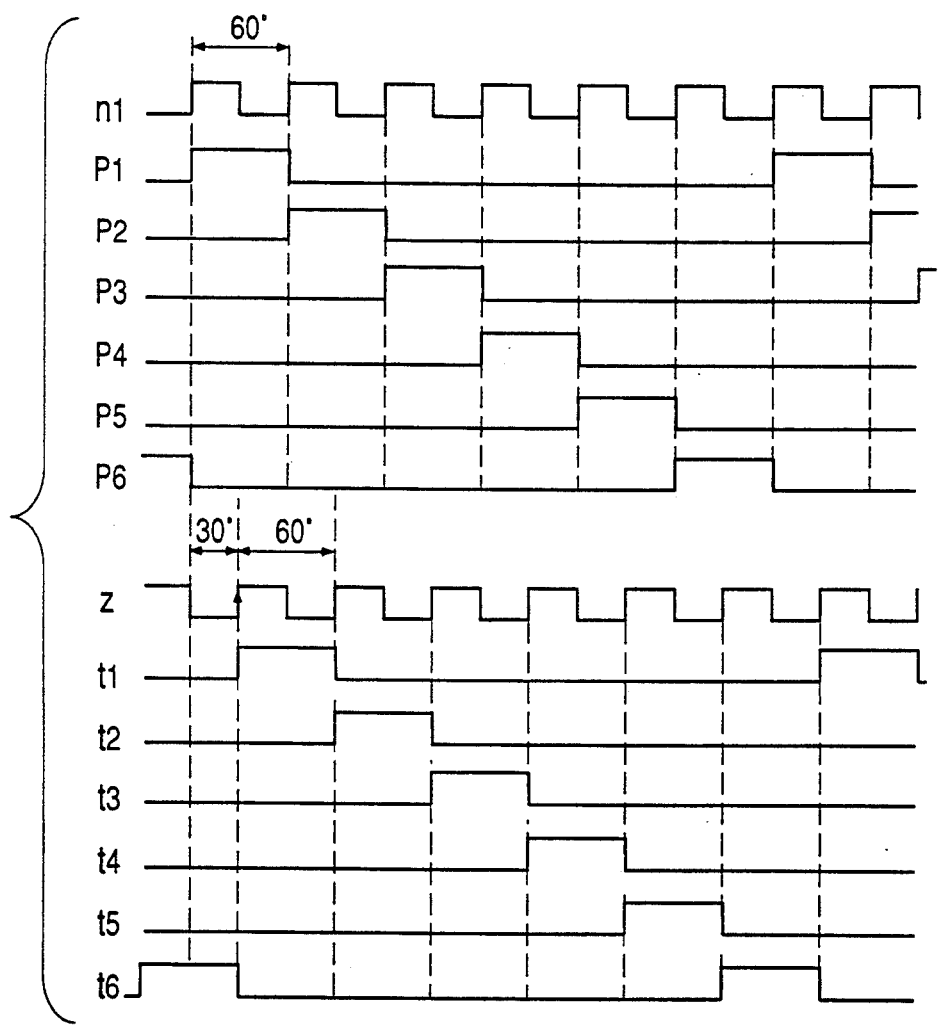
FIG. 13 is a diagram showing a signal waveform outputted from each member of the circuit shown in FIG. 12 and a signal waveform outputted from each member of a circuit shown in FIG. 14.

FIG. 12 is a circuit diagram of a logical pulse generating circuit 2 shown in FIG. 1 and FIG. 13 is a diagram showing a signal waveform outputted from each member of the circuit shown in FIG. 12.

In FIG. 12, the reference numeral 82 indicates a two-input OR circuit which receives the pulse train m outputted from the counter electromotive force detecting circuit 1 and the pseudo output pulse t element 81 is a six-phase ring counter which receives an output signal from the OR circuit 82 thereby to output six-phase pulse signals p1, p2 p3, p4, p5 and p6 as shown in FIG. 13 from the six terminals thereof. The pulse width of each of these signals is 60° in terms of electrical angle. These six-phase pulse signals p1, p2, p3, p4, p5 and p6 are sent to the position signal forming circuit 4 and selection signal generating circuit 6 shown in FIG. 1.

Figure 14:
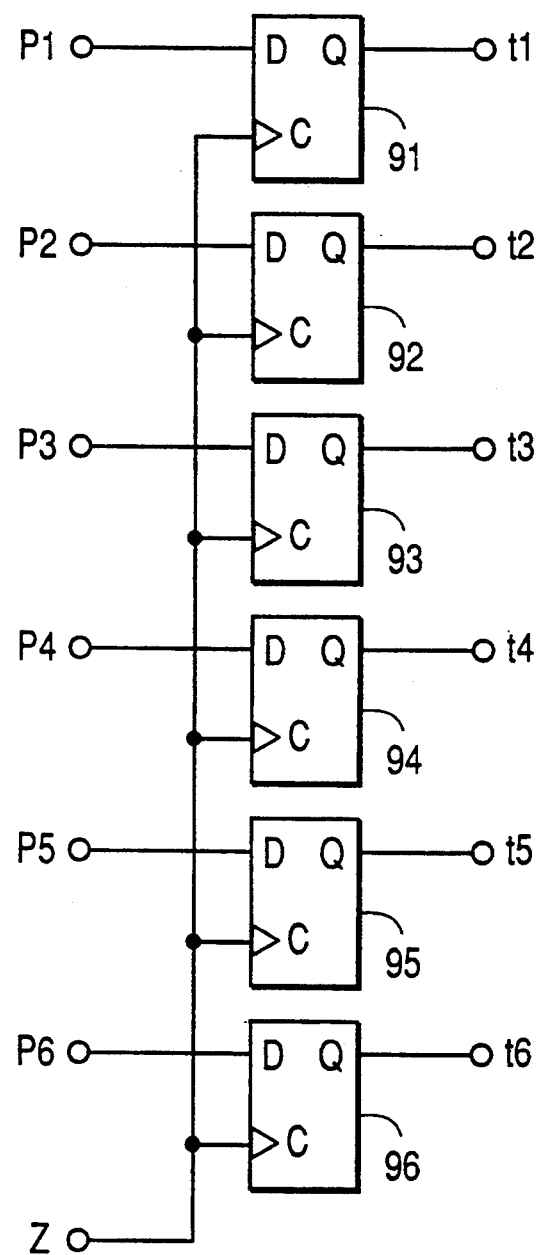
FIG. 14 is a circuit diagram of a selection signal generating circuit shown in FIG. 1.

FIG. 14 is a circuit diagram of a selection signal generating circuit 6 shown in FIG. 1 and the signal waveform outputted from each member thereof is shown in FIG. 13.

In FIG. 14, elements 91, 92, 93, 94, 95 and 96 are D flip-flops, each having a clock terminal C which receives the delay pulse signal z outputted from the pulse generating circuit 3 and an input terminal D which receives the six-phase pulse signals p1, p2, p3, p4, p5 and p6 outputted from the logical pulse generating circuit 2. As a result, from an output terminal Q of each D flip-flop are outputted the six-phase signals t1, t2, t3, t4, t5 and t6 which are respectively obtained by having the six-phase signals p1, p2, p3, p4, p5 and p6 outputted from the logical pulse generating circuit 2 delayed by a pulse width of the delay pulse signal z, whose waveforms are respectively shown at t1, t2, t3, t4, t5 and t6 in FIG. 13. These six-phase signals t1, t2, t3, t4, t5 and t6 are the six-phase selection signals t1, t2, t3, t4, t5 and t6 shown in FIG. 5, respectively, whose pulse width is 60° in terms of electrical angle. These signals are sent to the counter electromotive force detecting circuit 1.

Figure 15:
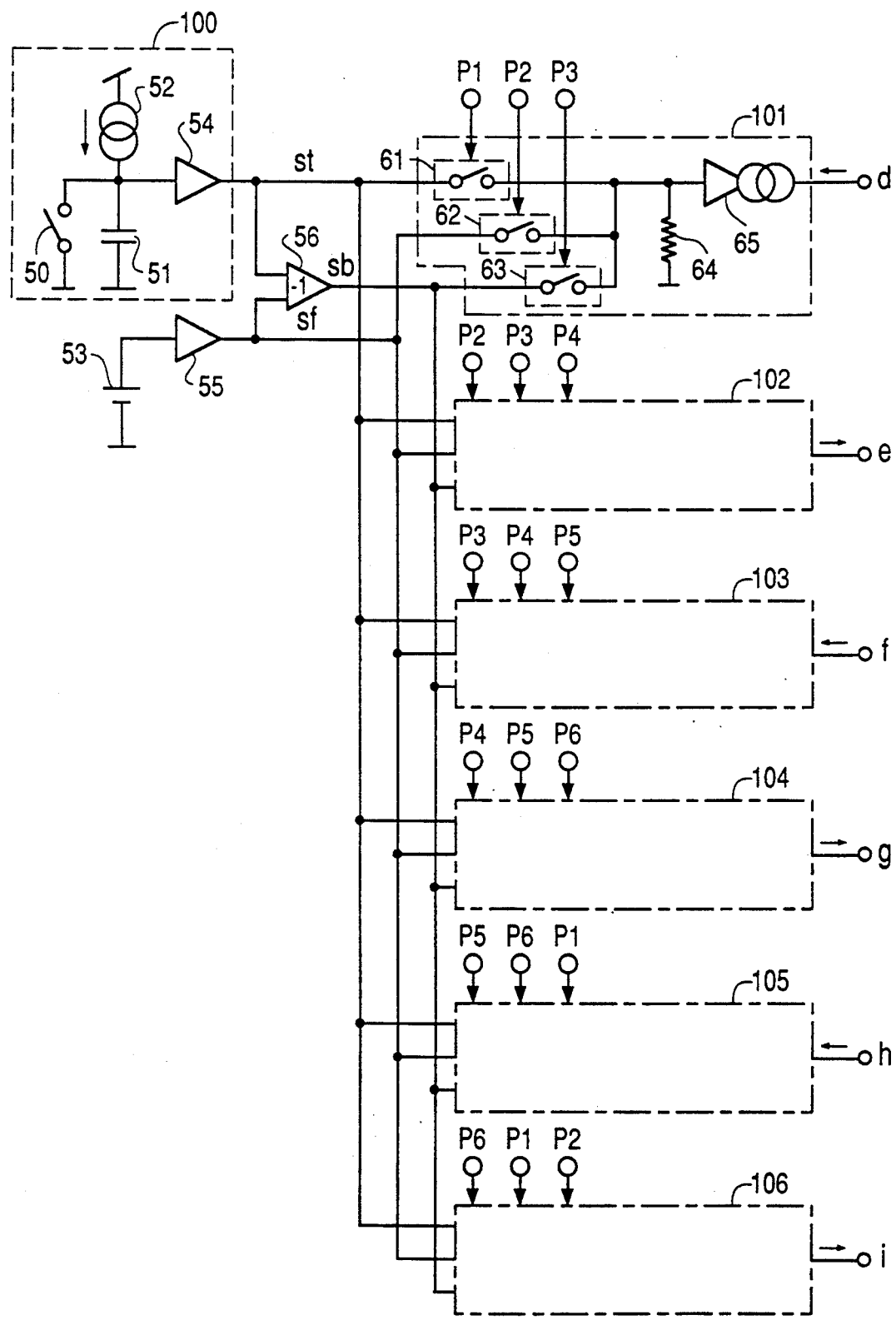
FIG. 15 is a circuit diagram of a position signal forming circuit shown in FIG. 1.
Figure 16:
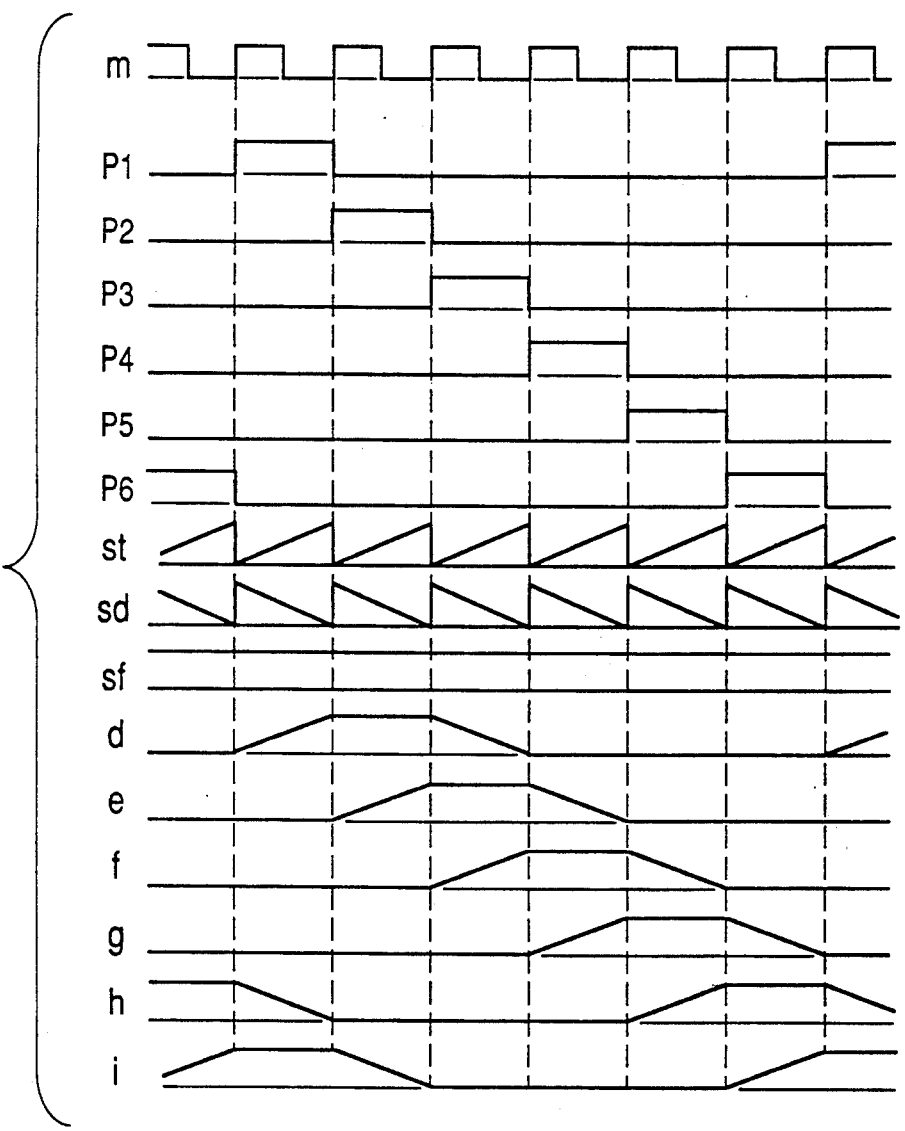
FIG. 16 is a diagram showing a signal waveform outputted from each member of the circuit shown in FIG. 15.

FIG. 15 is a circuit diagram of a position signal forming circuit 4 shown in FIG. 1 and FIG. 16 is a diagram showing a signal waveform outputted from each member thereof.

In FIG. 15 the reference numeral 50 indicates a reset switch and element 51 is a charging and discharging capacitor for generating a slant waveform signal in response to an output signal from the logical pulse generating circuit 2. The reset switch 50 is for discharging an electric charge stored in the charging and discharging capacitor 51. The reference numeral 52 indicates a constant electric current source circuit for supplying a charging current to the capacitor 51, and element 54 is a buffer amplifier having an input terminal connected to the capacitor 51. The capacitor 51, the reset switch 50, the constant electric current source circuit 52 and the buffer amplifier 54 form a slant waveform signal generating circuit 100. The reference numeral 55 indicates a buffer amplifier having an input terminal connected to a reference voltage source 53, and element 56 is an inverting amplifier which receives output signals from the buffer amplifiers 54 and 55. An output signal of each of the buffer amplifiers 54 and 55 and the inverting amplifier 56 is sent to each of the signal forming circuits 101, 102, 103, 104, 105 and 106. In this case, however, the signal forming circuits 101, 102, 103, 104, 105 and 106 are similar in arrangement to each other, and only the arrangement of the signal forming circuit 101, elements is typically shown in FIG. 15. In the signal forming circuit 101, 61, 62 and 63 are switches, having one end connected respectively to the buffer amplifier 54, the buffer amplifier 55 and the inverse amplifier 56, and having other ends which are commonly connected to a resistor 64. A voltage signal obtained through the resistor 64 is converted by an electric current converting circuit 65 into an electric current signal to become an output signal from the signal forming circuit 101.

Next, the operation of the position signal forming circuit 4 shown in FIG. 15 will be explained below while referring to FIG. 16.

When the switch 50 of the slant waveform signal generating circuit 100 is open, the capacitor 51 is supplied with a constant electric current by the constant electric current source circuit 52, and on the other hand, when it is closed, an electric charge stored in the capacitor 51 is discharged instantly. In this case, however, the switch 50 is closed only for a short period of time at the timing of the rising edges of the pulse train m outputted from the counter electromotive force detecting circuit 1. As a result, an electric charge stored in the capacitor 51 is discharged instantly at the timing of the rising edges of the pulse train m, so that a slant waveform signal having the same phase as that of the pulse train m can be obtained from the slant waveform signal generating circuit 100, which is shown at st in FIG. 16. A signal waveform of the reference voltage source circuit 53 is shown at sf in FIG. 16, whose magnitude is set as to be equal to the peak value of the slant waveform signal st. Signal waveform outputted from the inverse amplifier 56 is shown at sd in FIG. 16. The inverse amplifier 56 receives the signal st outputted from the buffer amplifier 54 and the signal sf outputted from the buffer amplifier 55, and outputs a signal as shown at sd in FIG. 16, which is obtained by inverting the signal st (sd=sf−st). The switches 61, 62 and 63 making the signal forming circuit 101 are operated in response to the pulse signals (p1, p2 and p3) outputted form the logical pulse generating circuit 2 in such a manner that they are switched ON when these signals are an "H" and they are switched OFF when these are an "L", so that the signals outputted respectively from the buffer amplifiers 54 and 55 and inverting amplifier 56 are combined by the signal forming circuit 101. In addition, when the signals p1, p2 and p3 all are in the "L" range, the switches 61, 62 and 63 all are switched OFF, and the electrical potential of the resistor 64 becomes equal to the ground potential. Such a composite voltage value as obtained by the resistor 64 is converted by the electric current converting circuit 65 into an electric current value (current to be taken in), and from the output terminal d is outputted a trapezoidal waveform position signal d as shown in FIG. 16

Similarly, the signal forming circuits 102, 103, 104, 105 and 106 output from their output terminals the trapezoidal waveform position signals e, f, g, h and i in response to the pulse signals (p2, p3, p4), (p3, p4, p5), (p4, p5, p6), (p5, p6, p1) and (p6, p1, p2), respectively. In this case, however, the position signals e, g and i outputted respectively from the signal forming circuit 102, 104 and 106 are of a type that an electric current is to be taken out and the position signals f and h outputted respectively from the circuits 103 and 105 are of the type that it is to be taken in similar to the signal d outputted from the circuit 101. The trapezoidal waveform signals d, e, f, g, h and i thus formed as shown in FIG. 16 become the position signals of the permanent magnet rotor 27 and are sent to the power supply circuit 5.

As is clear from the explanations as above, in a brushless DC motor of this invention, a counter electromotive force detecting circuit 1 detects only a zero-crossing point of each of the counter electromotive forces a, b and c respectively induced in the stator windings 11, 12 and 13 in a successive manner in response to the six-phase selection signals t1, t2, t3, t4, t5 and t6 to thereby shape the signals thus detected into a pulse train m. When a motor is being rotated normally, a logical pulse generating circuit 2 receives the pulse train m to generate six-phase pulse signals p1, p2, p3, p4, p5 and p6. In this case, however, the counter electromotive force detecting circuit 1 does not output the pulse train m when starting the motor, so that the logical pulse generating circuit 2 receives a pseudo output pulse t outputted from a pulse generating circuit 3 instead of receiving the pulse train m and generates the same six-phase pulse signals p1, p2, p3, p4, p5 and p6. These six-phase pulse signals p1, p2, p3, p4, p5 and p6 are sent to a position signal forming circuit 4 to be converted into position signals d, e, f, g, h and i as shown in FIG. 16, respectively. Finally, the power supply circuit 5 supplies drive currents j, k and 1 as shown in FIG. 3 bidirectionally to the stator windings 11, 12 and 13 in a successive manner in response to the position signals d, e, f, g, h and i, resulting in the rotation of the permanent magnet rotor 27.

As a result, a brushless DC motor of this invention makes it possible to provide a full wave drive motor capable of bidirectionally supplying an electric current to each of the stator wi without using a position sensor such as a Hall effect sensor. In addition, good starting characteristic of the motor can be provided without having a special starting circuit.

In addition, in the pulse generating circuit shown in FIG. 6, when the motor is being normally rotated, the clock frequency of a signal to be inputted to the second counter is twice as large as the clock frequency of a signal to be inputted to the first counter, but it may be of an integer multiple of that. Also, in the pulse generating circuit shown in FIG. 8, when the motor is being normally rotated, a value to be sent to the second counter as the initial value is one half the count value of the first counter, but it may be a value 1/N (N is an integer) of the count value of the first counter.

As clear from the above explanations, the pulse generating circuits 3 shown in FIGS. 6, 8 and 10 are structured so as to repeatably output a pseudo output pulse signal t with a constant period when the motor is to be started. Therefore, when the motor is to be started, the pulse generating circuit 3 continues to supply a switching pulse having a constant period to the logical pulse generating circuit 2, and the phase commutation between the stator windings is forcibly carried out with a constant frequency.

Figure 17:
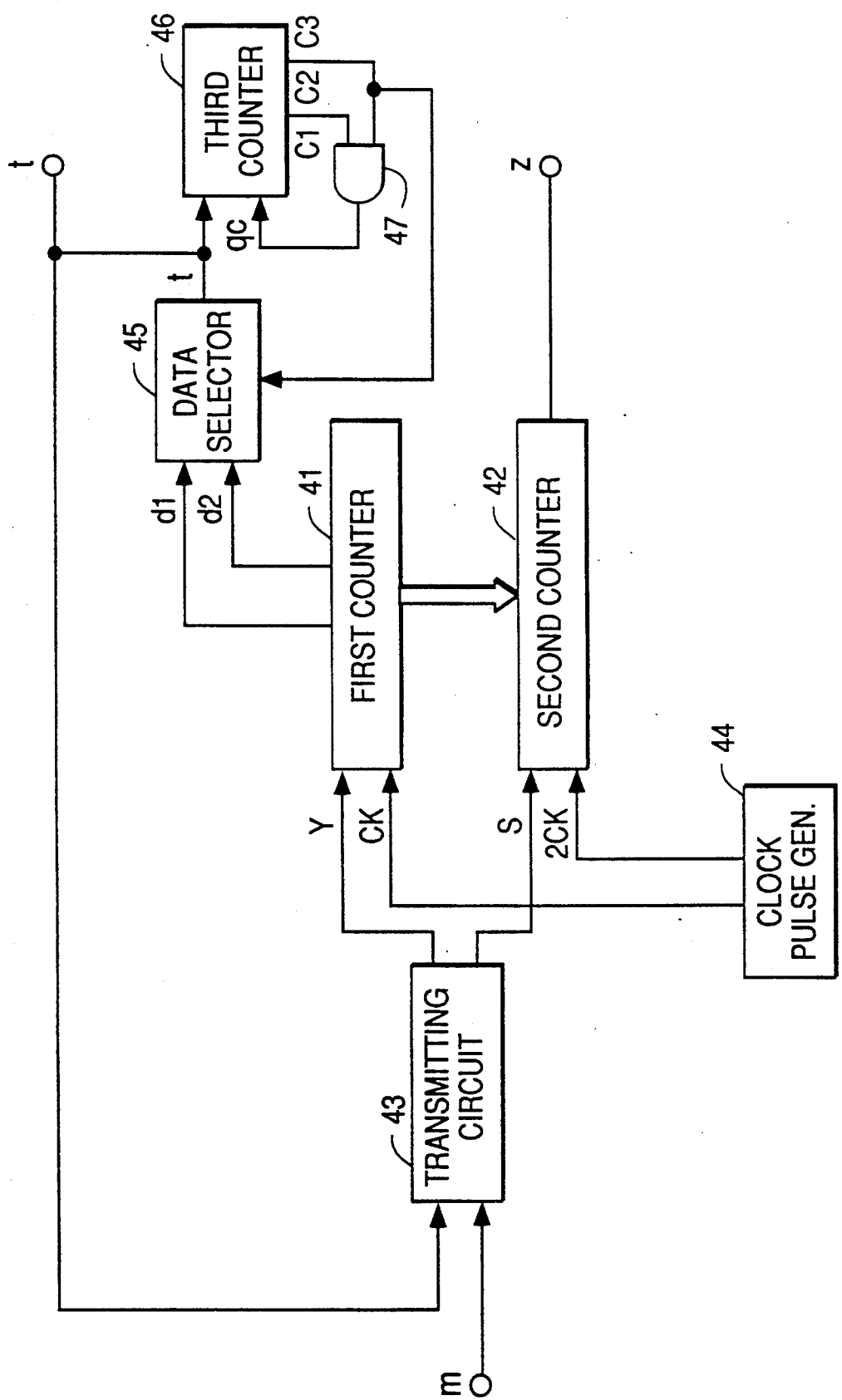
FIG. 17 is a circuit diagram of a pulse generating circuit showing still further example of that shown in FIG. 1.
Figure 18:
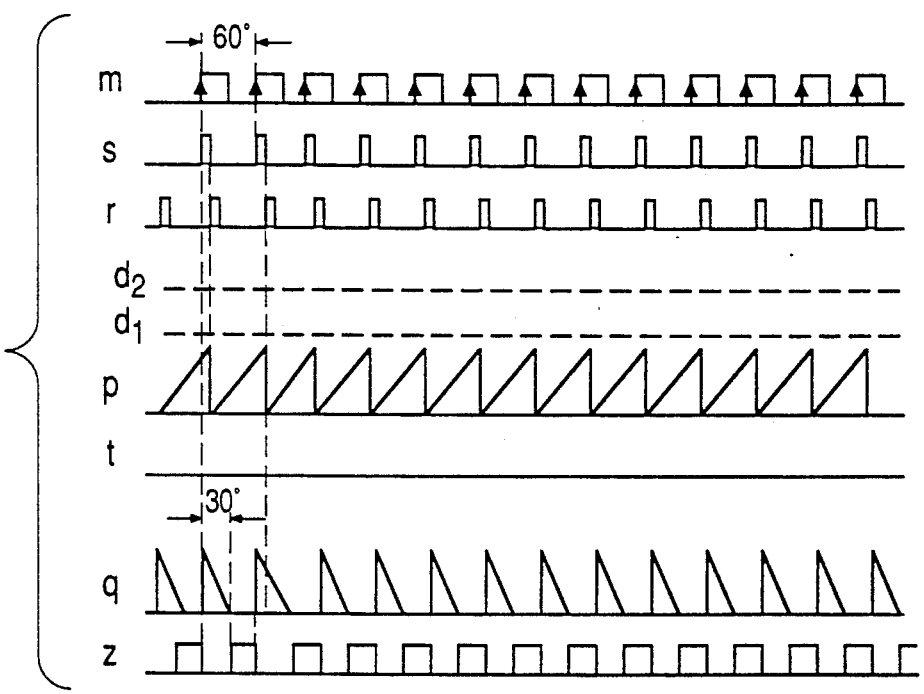
FIG. 18 is a diagram showing a signal waveform outputted from each member of the circuit shown in FIG. 17 when rotating normally.
Figure 19:
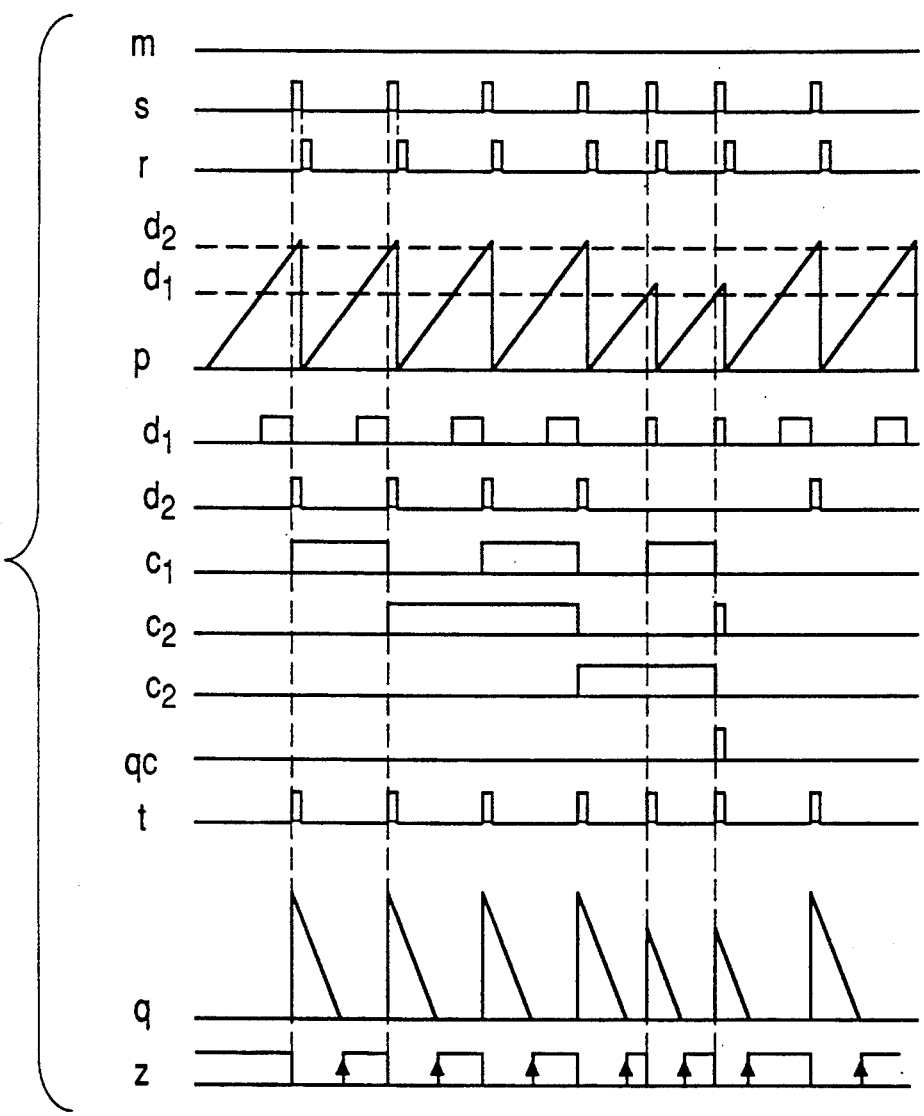
FIG. 19 is a diagram showing a signal waveform outputted from each member of the circuit shown in FIG. 17 when starting.
Figure 20A:
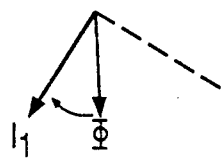
FIGS. 20(a)–20(f) and 21(a)–21(f) are vector diagrams showing a procedure of starting a brushless DC motor shown in FIG. 1.
Figure 20B:
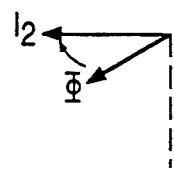
Figure 20C:
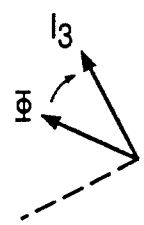
Figure 20D:
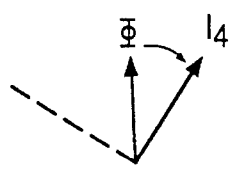
Figure 20E:
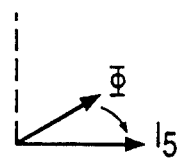
Figure 20F:
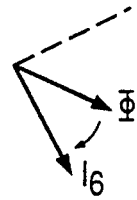

FIG. 17 is a circuit diagram of a pulse generating circuit showing further example of the pulse generating circuit 3 shown in FIG. 1. This is arranged based on the pulse generating circuit shown in FIG. 6 and repeatable outputs pseudo output signals t having different periods to the logical pulse generating circuit 2 when the motor is to be started. FIG. 18 is a diagram showing a signal waveform outputted from each member thereof when rotating normally and FIG. 19 is a diagram showing a signal waveform outputted from each member thereof when the motor is to be started. In FIG. 17, element 41 is a first counter, element 42 is a second counter and element 44 is a clock pulse generating circuit. The clock pulse generating circuit 44 generates two kinds of clock pulses, ck and 2ck. The clock pulse ck is sent to the first counter 41 and the clock pulse of 2ck (in this case, the clock frequency is twice as large as ck) is sent to the second counter 42. The first counter 41 outputs a signal d2 which is of the most significant bit and a signal d1 which is of an intermediate bit. These bit signals d1 and d2 thus outputted are sent to a data selector 45. The second counter 42 outputs a zero-flag z when its count value becomes zero. The data selector 45 selects either bit signal d1 or d2 in response to a selection signal c3 inputted thereto and outputs a pulse signal t. A transmitting circuit 43 receives the pulse train m outputted from the counter electromotive force detecting circuit 1 and the pulse signal t outputted from the data selector 45. The transmitting circuit 43 outputs a reset pulse r to the first counter 41 for resetting its count value and a load pulse s to the second counter 42 for loading the count value of the first counter 41. A third counter 43 counts the number of pulses of the pulse signal t outputted from the data selector 45. An AND circuit 47 receives two kinds of bit output, c2 and c3 which are outputted from the third counter 46 and outputs a pulse signal qc of an "H" when the bit output signals c2 and c3 both become an "H". The pulse signal qc is a reset pulse of the third counter 46 for resetting the count value thereof. Also, the zero flag z outputted from the second counter 42 corresponds to the delay pulse z inputted to the selection signal generating circuit 6, and the pulse signal t outputted from the data selector 45 corresponds to the pseudo output signal t inputted to the logical pulse generating circuit 2.

The operation of the pulse generating circuit 3 shown in FIG. 17 when the motor is being normally rotated will be explained while referring to FIG. 18.

The first counter 41 continues to up-count the clock pulse ck until the reset pulse r outputted from the transmitting circuit 43 is received. Since the reset pulse r is equal in period to the pulse train m outputted from the counter electromotive force detecting circuit 1, the count value of the first counter 41 results in counting the period of the pulse train m outputted from the counter electromotive force detecting circuit 1. Such a state is shown analogically in FIG. 18p. When the motor is being normally rotated, a period of the reset pulse signal r is sufficiently short, so that the bit output signals d1 and d2 outputted from the first counter 41 do not become an "H". Also, two levels of the signals d1 and d2 shown by the dotted lines in FIG. 18p show the count values of the first counter 41 respectively when the signals d1 and d2 become "H". As a result, the data selector 45 does not output such a pseudo output signal t as shown in FIG. 18t. To the second counter 42, the count value p of the first counter 41 is sent as the initial value at the timing of the load pulse s outputted from the transmitting circuit 43. The second counter 42 down-counts the count value p obtained by counting the period of the pulse train m outputted from the counter electromotive force detecting circuit 1 with the clock pulse of 2ck, so that the count value thereof becomes zero at the middle point of the load pulse s (or the rising edges of the pulse train m). This state is shown analogically in FIG. 18q. The second counter 42 outputs a zero flag when the count value thereof becomes zero, so that it outputs a pulse signal z as shown in FIG. 18z. The rising edges of the pulse train m of the counter electromotive force detecting circuit 1 show zero-crossing points of the counter electromotive forces a, b and c respectively induced in the stator windings 11, 12 and 13, so that the interval of the pulse becomes 60° in terms of electrical angle. As a result, the rising edges of the pulse signal z shown in FIG. 18z are delayed by 30° in terms of electrical angle from the corresponding zero-crossing points of the counter electromotive forces a, b and c. The pulse signal z is sent to the selection signal generating circuit 6 as a delay pulse signal. In addition, there exists a relationship between the phases of the load pulse s and the reset pulse r as shown in FIG. 18. The fact that the reset pulse r is delayed from the load pulse s is to make sure of transmitting the count value of the first counter 41 to the second counter 42. Also, in FIG. 18, the pulse widths of the pulses s and r are large for the sake of convenience, but they are sufficiently small as compared with the pulse period.

Next, the operation of the pulse generating circuit 3 shown in FIG. 17 when the motor is to be started will be explained by referring to FIG. 19. The first counter 41 continues to up-count the clock pulse ck until it receives the reset pulse r from the transmitting circuit 43. In this case, however, the rotor 27 is stationary and the counter electromotive force detecting circuit 1 does not output the pulse train m. AS a result, the count value of the first counter 41 is monotonously increased as shown in FIG. 19p, and when the count value thereof becomes a predetermined value (shown by the dotted lines in FIG. 19p), the first counter 41 outputs the bit output signals d1 and d2 to the data selector 45. Then, the data selector 45 outputs the signal t to the transmitting circuit 43. After receiving the signal t, the transmitting circuit 43 outputs the resent pulse r and load pulse s. The second counter 42 loads the initial value with the load pulse s and then, down-counts the same. When the count value thus down-counted becomes zero, the second counter 42 outputs the zero flag z as a delay pulse. When the motor is to be started, the counter electromotive force detecting circuit 1 does not output the pulse train m, and the data selector 45 continues to output the pulse signal t. First, the data selector 45 selects the bit output signal d2 of the first counter 41 as a pulse signal t, and the number of pulses of the signal d2 is counted by the third counter 46. Here, suppose that the third counter 46 is a three-bit counter and counts pulses as shown at c1, c2 and c3 of FIG. 19. When the third counter 46 counts the pulse signal t in a successive manner and the output signals c2 and c3 become an "H" (counting the pulse t six times), an output signal qc of the AND circuit 47 becomes an "H". Thus, the signal qc is sent to the third counter 46 to reset the count value inputted. Then, the motor starts to rotate, and the above-mentioned operation is repeated until the counter electromotive force detecting circuit 1 outputs the pulse train m. In this case, however, the output signal c3 from the third counter 46 is also used as a selection signal of the data selector 45, and after counting the pulse signal t four times, it becomes an "H" as shown in FIG. 19 c3. As a result, the data selector 45 selects the bit output signal d1 of the first counter 41 as a pulse t at this time. The bit output signal d1 is of an intermediate bit of the first counter 41, so that as shown in FIG. 19p, the count value of the first counter 41 is loaded to the second counter 42 at a shorter period than that obtained when the data selector 45 selects the bit output signal d2. After loading the initial value with the load pulse s, the second counter 42 down-counts it, and the count value q of the second counter 42 becomes zero in a shorter period of time, resulting in outputting a delay pulse signal z shorter in period. As a result, a pulse z having a period comparatively long is repeatedly outputted four times and another pulse z having a period short as compared therewith is repeatedly outputted two times. These states are shown in FIGS. 19q and z.

As explained above, when the motor is to be started, the pulse generating circuit 2 shown in FIG. 17 outputs a pseudo output pulse t in which a pulse comparatively long in period is repeatedly outputted four times and another pulse short in period as compared therewith is repeatedly outputted two times.

FIGS. 20(a)-20(f) and 21(a)-21(f) are vector diagrams of the pulse generating circuit 3 shown in FIG. 17 when the motor is to be started.

FIGS. 20(a)-20(f) show a positional relationship between a composite current vector I of the motor and a $\phi$ of the permanent magnet rotor 27 (which is a vector showing a position of the N-pole of the rotor 27) when the logical pulse generating circuit 2 is supplied with a pseudo output pulse t with a constant period. In FIGS. 20(a)-20(f) shown by the dotted line are positions where zero-crossing points of the counter electromotive forces induced in the stator windings are subsequently detected, which are selected by selection signals outputted from the selection signal generating circuit 6. That is, the counter electromotive force detecting circuit 1 detects zero-crossing points of the counter electromotive forces at the time when the magnetic pole vector $\phi$ of the permanent magnet rotor 27 passes through the dotted lines shown in FIGS. 20(a)-20(f) and outputs a pulse m (rising edges). As clear from FIGS. 20(a)-20(f), the positions where the zero-crossing points of counter electromotive forces are detected are also steppedly rotated by 60° at a time in response to an output from the selection signal generating circuit 6. In this case, however, the magnetic pole vector $\phi$ of the permanent magnet rotor 27 is already at a position passing through the position to detect the zero-crossing point of a counter electromotive force, which means that the counter electromotive force detecting circuit 1 cannot detect zero-crossing points of the counter electromotive forces eternally. As a result, it is almost impossible to shift the normal position detection mode to drive the motor by detecting the zero-crossing points of counter electromotive forces, resulting in failing to accelerate the rotation of the motor smoothly.

Figure 21A:
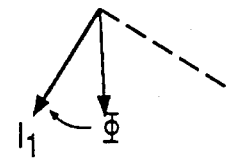
Figure 21B:
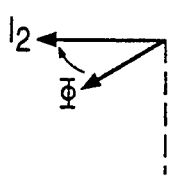
Figure 21C:
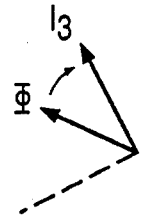
Figure 21D:
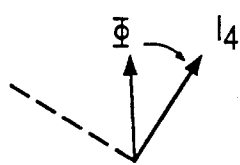
Figure 21E:
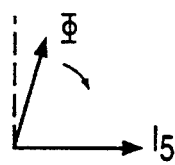
Figure 21F:
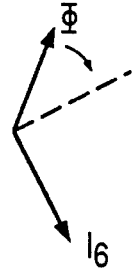

In the other hand, FIGS. 21(a)-21(f) show a positional relation between a composite current vector I of the motor and a magnetic pole vector $\phi$ of the permanent magnet rotor 27 when supplying the logical pulse generating circuit 2 with a pulse signal t in which a pulse comparatively long in period is repeatedly outputted four times and another pulse short in period as compared therewith is repeatedly outputted two times. In addition, in FIGS. 21(a)-21(f), shown by the dotted line are positions of zero-crossing points of the counter electromotive forces to be subsequently detected, in the same way as in FIG. 20, which are selected by selection signals outputted from the selection signal generating circuit 6. The pseudo output pulse t having a constant period is supplied to the logical pulse generating circuit 2 up to the fourth pulse from the starting of the motor. In this case, however, the fifth and sixth pseudo output pulses t are short in period as compared with the four preceding pulses, so that the conducting phase is commutated before the permanent magnet rotor 27 is rotated up to the position shown in FIG. 21(e). This state is shown in FIG. 21(e). As clear from FIG. 21(e), the permanent magnet rotor 27 is positioned delayed in the rotational direction compared with the state shown in FIG. 20(e). Further, the permanent magnet rotor 27 is further delayed in the rotational direction by the sixth pseudo output pulse t which is short in period, that is, positioned at a position on this side of the position where the zero-crossing point of a counter electromotive force is to be detected. As a result, the counter electromotive force detecting circuit 1 can detect a zero-crossing point of each of the counter electromotive forces before the next pseudo output pulse t is supplied. This state is shown in FIG. 21(f). After the counter electromotive force detecting circuit 1 has detected zero-crossing points of the counter electromotive forces, a, b and c, the mode is shifted to the normal position detection mode to thereby commutate the conducting phase of the stator windings of the motor in a successive manner, resulting in accelerating the rotation of the motor smoothly.

In the pulse generating circuit shown in FIG. 17, the clock frequency of a signal inputted to the second counter 42 is twice as large as the clock frequency of a signal inputted to the first counter 41, but it may be of an integer multiple of that. Also, the pulse generating circuit shown in FIG. 17 is arranged based on the circuit shown in FIG. 6 such that pseudo output pulses t different in period from each other are repeatedly applied to the logical pulse generating circuit 2 when the motor is to be started, but it may be arranged based on the circuit shown in FIG. 10.

In addition, the counter electromotive force detecting circuit 1 shown in FIG. 1 uses three resistors connected in common to detect an electric potential of the neutral point o of the stator windings, however, it is needless to say a signal line can be used by taking out directly from the neutral point of the stator windings of a motor for this purpose. Further in addition, in these embodiments of this invention described above, a motor to be used is limited to a three-phase motor having stator windings of a Y (star) connection, but it is not limited thereto, being capable of using a motor of any number of phases. Also, a brushless DC motor of this invention can be applied to a motor having stator windings of a (delta) connection.

What is claimed is:

1. A brushless DC motor comprising:
a plurality of stator windings;
a pulse generating means which generates at least one pulse signal train with a different period when starting for commuting the conducting phase of said plurality of stator windings in a successive manner;
a logical pulse generating means for generating a plurality of pulse signals in response to a pulse train outputted from said pulse generating means;
a position signal forming means for forming a position signal in response to a pulse signal outputted from said logical pulse generating means; and
a power supply means for supplying electric power to said plurality of stator windings in response to said position signal;
wherein when starting, said pulse generating means outputs a predetermined number of pulse signals having a constant period, followed by continuously outputting a pulse signal having a period 1/N (N is an integer) said constant period.

2. A brushless DC motor comprising:
a plurality of stator windings;
a counter electromotive force detecting means for generating a pulse signal train from a counter electromotive force induced in a selected one of said plurality of stator windings in response to multi-phase selection signals;
a pulse generating means for generating a delay pulse signal obtained by delaying said pulse signal train;
a selection signal generating circuit for generating said multi-phase selection signals in response to said delay pulse signal;
a logical pulse generating means for generating a plurality of pulse signals in response to said pulse signal train;
a position signal forming means for forming a position signal in response to a pulse signal outputted from said logical pulse generating means; and
a power supply circuit for supplying said plurality of stator windings with electric power in response to said position signal;
wherein said position signal forming means comprises:
a slant waveform signal generating means for generating a slant waveform signal in response to a pulse signal outputted from either said counter electromotive force detecting means or said logical pulse generating means; and
a signal forming means for forming a plurality of position signals in response to a pulse signal outputted from said logical pulse generating means.

3. A brushless DC motor comprising:
a plurality of stator windings;
a counter electromotive force detecting means for generating a pulse signal train from a counter electromotive force induced in a selected one of said plurality of stator windings in response to multi-phase selection signals;
a pulse generating means for generating a delay pulse signal obtained by delaying said pulse signal train;
a selection signal generating circuit for generating said multi-phase selection signals in response to said delay pulse signal;
a logical pulse generating means for generating a plurality of pulse signals in response to said pulse signal train;
a position signal forming means for forming a position signal in response to a pulse signal outputted from said logical pulse generating means; and
a power supply circuit for supplying said plurality of stator windings with electric power in response to said position signal;
wherein said pulse generating means delays said pulse signal train outputted from said counter electromotive force detecting means so as to output said delay pulse signal, said pulse generating means including a means for varying a delay time of said delay pulse signal according to variations of a period of said pulse signal train so as to maintain said delay time proportional or approximately proportional to said period of said pulse signal train outputted from said counter electromotive force detecting means.

4. A brushless DC motor as claimed in claim 3, wherein said pulse generating means outputs a delay pulse signal delayed by a time 1/N (N is an integer) the period of said pulse signal train outputted from said counter electromotive force detecting means.

5. A brushless DC motor as claimed in claim 3, wherein said pulse generating means outputs a delay pulse signal delayed by a time half the period of said pulse signal train outputted from said counter electromotive force detecting means.

6. A brushless DC motor comprising:
a plurality of stator windings;
a counter electromotive force detecting means for generating a pulse signal train from a counter electromotive force induced in a selected one of said plurality of stator windings in response to multi-phase selection signals;
a pulse generating means for generating a delay pulse signal obtained by delaying said pulse signal train;
a selection signal generating circuit for generating said multi-phase selection signals in response to said delay pulse signal;
a logical pulse generating means for generating a plurality of pulse signals in response to said pulse signal train;

a position signal forming means for forming a position signal in response to a pulse signal outputted from said logical pulse generating means; and a power supply circuit for supplying said plurality of stator windings with electric power in response to said position signal;

wherein said pulse generating means comprises:

a first counter means for counting a period of said pulse signal train outputted from said counter electromotive force detecting means;

a transmitting means for transmitting a count value of said first counter means to a second counter means;

said second counter means outputting said delay pulse signal delayed by a time proportional or approximately proportional to a period of said pulse signal train from the count value thus transmitted; and a clock pulse generating means for outputting a clock signal to said first and second counter means.

7. A brushless DC motor as claimed in claim 6, wherein a clock signal frequency to be inputted to said second counter means is different from that to be inputted to said first counter means.

8. A brushless DC motor as claimed in claim 6, wherein a clock signal frequency to be inputted to said second counter means is of an integer multiple of that to be inputted to said first counter means.

9. A brushless DC motor as claimed in claim 6, wherein a clock signal frequency to be inputted to said second counter means is twice that to be inputted to said first counter means.

10. A brushless DC motor as claimed in claim 6, wherein said transmitting means transmits a value 1/N (N is an integer) a count value of the first counter means to said second counter means.

11. A brushless DC motor as claimed in claim 6, wherein said transmitting means transmits a value half a count value of said first counter means to said second counter means.

12. A brushless DC motor comprising:

a plurality of stator windings;

a counter electromotive force detecting means for generating a pulse signal train from a counter electromotive force induced in a selected one of said plurality of stator windings in response to multi-phase selection signals;

a pulse generating means which supplies a logical pulse generating means with a delay pulse signal obtained by delaying said pulse signal train when the period of said pulse signal train is within a predetermined range and with a pseudo output pulse signal when the period of said pulse signal train exceeds the predetermined range;

said logical pulse generating means generating a plurality of pulse signals in response to said pulse signal train and said pseudo output pulse signal;

a selection signal generating means for generating said multi-phase selection signals in response to said delay pulse signal;

a position signal forming means for forming a plurality of position signals in response to a pulse signal outputted from said logical pulse generating means; and a power supply means for supplying said plurality of stator windings with electric power in response to said position signals.

13. A brushless DC motor as claimed in claim 12, wherein said position signal forming means comprises:

a slant waveform signal generating means for generating a slant waveform signal in response to a pulse signal of either said counter electromotive force detecting means or said logical pulse generating means; and a signal forming means for forming said plurality of position signals in response to a pulse signal outputted from said logical pulse generating means.

14. A brushless DC motor as claimed in claim 12, wherein said pulse generating means outputs a delay pulse signal delayed by a time proportional or approximately proportional to a period of said pulse signal train outputted by said counter electromotive force detecting means.

15. A brushless DC motor as claimed in claim 12, wherein said pulse generating means outputs a delay pulse signal delayed by a time 1/N (N is an integer) the period of said pulse signal train outputted by said counter electromotive force detecting means.

16. A brushless DC motor as claimed in claim 12, wherein said pulse generating means outputs a delay pulse signal delayed by a time half the period of said pulse signal train outputted by said counter electromotive force detecting means.

17. A brushless DC motor as claimed in claim 12, wherein said pulse generating means comprises:

a first counter means for counting a period of said pulse signal train outputted by said counter electromotive force detecting means;

a transmitting means for transmitting a count value of said first counter means to a second counter means;

said second counter means outputting said delay pulse signal delayed by a time proportional or approximately proportional to a period of said pulse signal train from the count value thus transmitted; and a clock signal generating means for outputting a clock signal to said first and second counter means.

18. A brushless DC motor as claimed in claim 17, wherein a clock signal frequency to be inputted to said second counter means is different from that to be inputted to said first counter means.

19. A brushless DC motor as claimed in claim 17, wherein a clock signal frequency to be inputted to said second counter means is of an integer multiple of that to be inputted to said first counter means.

20. A brushless DC motor as claimed in claim 17, wherein a clock signal frequency to be inputted to said second counter means is twice that to be inputted to said first counter means.

21. A brushless DC motor as claimed in claim 17, wherein said transmitting means transmits a different value to said second counter means as an initial value in response to a count value of said first counter means.

22. A brushless DC motor as claimed in claim 17, wherein said transmitting means transmits a value 1/N (N is an integer) a count value of said first counter means to said second counter means.

23. A brushless DC motor as claimed in claim 17, wherein said transmitting means transmits a value half a count value of said first counter means to said second counter means.

24. A brushless DC motor comprising:

a plurality of stator windings;

a counter electromotive force detecting means for generating a pulse signal train from a counter electromotive force induced in a selected one of said plurality of stator windings in response to multi-phase selection signals;

a pulse generating means which outputs a delay pulse signal obtained by delaying said pulse signal train when a period of said pulse signal train is within a predetermined range, and outputs a delay pulse signal different in the amount of delay from said first-mentioned delay pulse signal and a pseudo output pulse signal when the period of said pulse signal train exceeds the predetermined range;

a selection signal generating means for generating said multi-phase selection signals in response to said delay pulse signal;

a logical pulse generating means for generating a plurality of pulse signals in response to said pulse signal train and said pseudo output pulse signal;

a position signal forming means for forming a plurality of position signals in response to a pulse signal outputted from said logical pulse generating means;

a power supply means for supplying said plurality of stator windings with electric power in response to said position signals.

25. A brushless DC motor as claimed in claim 24, wherein said position signal forming means comprises:

a slant waveform signal generating means for generating a slant waveform signal in response to a pulse signal outputted from either said counter electromotive force detecting means or said logical pulse generating means; and a signal forming means for forming said plurality of position signals in response to a pulse signal outputted from said logical pulse generating means.

26. A brushless DC motor as claimed in claim 24, wherein when a period of said pulse signal train outputted from said counter electromotive force detecting means is within a predetermined range, said pulse generating means outputs a delay pulse signal delayed by a time proportional or approximately proportional to the period of said pulse signal train.

27. A brushless DC motor as claimed in claim 24, wherein when a period of said pulse signal train outputted from said counter electromotive force detecting means is within a predetermined range, said pulse generating means outputs a delay pulse signal delayed by a time 1/N (N is an integer) the period of said pulse signal train.

28. A brushless DC motor as claimed in claim 24, wherein when a period of said pulse signal train outputted from said counter electromotive force detecting means is within a predetermined range, said pulse generating means outputs a delay pulse signal delayed by a time half the period of said pulse signal train.

29. A brushless DC motor as claimed in claim 24, wherein when a period of said pulse signal train outputted from said counter electromotive force detecting means exceeds a predetermined range, said pulse generating means outputs a delay pulses signal delayed by an amount smaller than that obtained when said period is within the predetermined range.

30. A brushless DC motor as claimed in claim 24, wherein said pulse generating means comprises:

a first counter means for counting a period of said pulse signal train of said counter electromotive force detecting means;

a transmitting means for transmitting a count value of said first counter means to a second counter means;

said second counter means outputting said delay pulse signal delayed by a time proportional or approximately proportional to a period of said pulse signal train from the count value thus transmitted; and a clock pulse generating means for outputting a clock signal to said first and second counter means.

31. A brushless DC motor as claimed in claim 30, wherein a clock signal frequency to be inputted to said second counter means is different from that to be inputted to said first counter means.

32. A brushless DC motor as claimed in claim 30, wherein when a count value of said first counter means is within a predetermined range, a clock signal frequency to be inputted to said second counter means is of an integer multiple of that to be inputted to said first counter means.

33. A brushless DC motor as claimed in claim 30, wherein when a count value of said first counter means is within a predetermined range, a clock signal frequency to be inputted to said second counter means is twice that to be inputted to said first counter means.

34. A brushless DC motor as claimed in claim 30, wherein when a count value of said first counter means exceeds a predetermined range, a clock signal frequency to be inputted to said second counter means is larger than that to be inputted thereto when said count value is within the predetermined range.

35. A brushless DC motor as claimed in claim 30, wherein when a count value of said first counter means exceeds a predetermined range, a clock signal frequency to be inputted to said second counter means is of an integer multiple of that to be inputted thereto when said count value is within the predetermined range.

36. A brushless DC motor as claimed in claim 30, wherein when a count value of said first counter means exceeds a predetermined range, a clock signal frequency to be inputted to said second counter means is twice that to be inputted thereto when said count value is within the predetermined range.

37. A brushless DC motor as claimed in claim 30, wherein said transmitting means transmits a different value to said second counter means as an initial value in response to a count value of said first counter means.

38. A brushless DC motor as claimed in claim 30, wherein when a count value of said first counter means is within a predetermined range, said transmitting means transmits a value 1/N (N is an integer) the count value of said first counter means to said second counter means.

39. A brushless DC motor as claimed in claim 30, wherein when a count value of said first counter means is within a predetermined range, said transmitting means transmits a value half the count value of said first counter means to said second counter means.

40. A brushless DC motor as claimed in claim 30, wherein when a count value of said first counter means exceeds a predetermined range, said transmission means transmits a value smaller than that to be transmitted thereto when said count value is within the predetermined range to said second counter means.

41. A brushless DC motor as claimed in claim 30, wherein when a count value of said first counter means exceeds a predetermined range, said transmitting means transmits a value 1/N (N is an integer) that to be transmitted thereto when said count value is within the predetermined range to said second counter means as an initial value.

42. A brushless DC motor as claimed in claim 30, wherein when a count value of said first counter means exceeds a predetermined range, said transmitting means transmits a value half that to be transmitted thereto when said count value is within the predetermined range to said second counter means as an initial value.

43. A brushless DC motor as claimed in claim 30, wherein when a count value of said first counter means exceeds a predetermined range, said transmitting means transmits a constant value to said second counter means.

44. A brushless DC motor comprising:
   a plurality of stator windings;
   a counter electromotive force detecting means for generating a pulse signal train from a counter electromotive force induced in a selected one of said plurality of stator windings in response to multi-phase selection signals;
   a pulse generating means which outputs a delay pulse signal obtained by delaying said pulse signal train when a period of said pulse signal train is within a predetermined range and a pseudo output pulse signal when the period of said pulse signal train exceeds the predetermined range, wherein when more than a predetermined number of said pseudo output signals are continuously outputted, at least one of said pseudo output signals are different in interval to be outputted;
   a selection signal generating means for outputting said multi-phase selection signals in response to said delay pulse signal;
   a logical pulse generating means for generating a plurality of pulse signals in response to said pseudo output signal and said pulse signal train;
   a position signal forming means for forming a position signal in response to a pulse signal from said logical pulse generating means; and
   a power supply means for supplying electric power to said plurality of stator windings in response to said position signal.

45. A brushless DC motor as claimed in claim 44, wherein said position signal forming means comprises:
   a slant waveform signal generating means for generating a slant waveform signal in response to a pulse signal of either said counter electromotive force detecting means or said logical pulse generating means; and
   a signal forming means for forming said plurality of position signals in response to a pulse signal from said logical pulse generating means.

46. A brushless DC motor as claimed in claim 44, wherein when a period of said pulse signal train outputted from said counter electromotive force detecting means is within a predetermined range, said pulse generating means outputs a delay pulse signal delayed by a time proportional or approximately proportional to the period of said pulse signal train.

47. A brushless DC motor as claimed in claim 44, wherein when a period of said pulse signal train outputted from said counter electromotive force detecting means is within a predetermined range, said pulse generating means outputs a delay pulse signal delayed by a time 1/N (N is an integer) the period of said pulse signal train.

48. A brushless DC motor as claimed in claim 44, wherein when a period of said pulse signal train outputted from said counter electromotive force detecting means is within a predetermined range, said pulse generating means outputs a delay pulse signal delayed by a time half the period of said pulse signal train.

49. A brushless DC motor as claimed in claim 44, wherein when a period of said pulse signal train outputted from said counter electromotive force detecting means exceeds a predetermined range, said pulse generating means outputs a pseudo output signal having a constant period by a predetermined number, followed by continuously outputting a pseudo output signal having a period smaller than said constant period.

50. A brushless DC motor as claimed in claim 44, wherein when a period of said pulse signal train outputted from said counter electromotive force detecting means exceeds a predetermined range, said pulse generating means outputs a pseudo output signal having a constant period by a predetermined number, followed by continuously outputting a pseudo output pulse having a period 1/N (N is an integer) said constant period.

51. A brushless DC motor as claimed in claim 44, wherein said pulse generating means comprises:
   a first counter means for counting a period of said pulse signal train outputted from said counter electromotive force detecting means;
   a transmitting means for transmitting a count value of said first counter means to a counter means; said second counter means outputting said delay pulse signal delayed by a time proportional or approximately proportional to a period of said pulse signal train from the count value thus transmitted; and
   a clock pulse generating means for outputting a clock signal to said first and second counter means.

52. A brushless DC motor as claimed in claim 51, wherein a clock signal frequency to be inputted to said second counter means is different from that to be inputted to said first counter means.

53. A brushless DC motor as claimed in claim 51, wherein a clock signal frequency to be inputted to said second counter means is of an integer multiple of that to be inputted to said first counter means.

54. A brushless DC motor as claimed in claim 51, wherein a clock signal frequency to be inputted to said second counter means is twice that to be inputted to said first counter means.

55. A brushless DC motor as claimed in claim 51, wherein said transmitting means transmits a different value to second counter means as an initial value in response to a count value of said first counter means.

56. A brushless DC motor as claimed in claim 51, wherein said transmitting means transmits a value 1/N (N is an integer) a count value of said first counter means to said second counter means.

57. A brushless DC motor as claimed in claim 51, wherein said transmitting means transmits a value half a count value of said first counter means to said second counter means.

* * * * *